(12) United States Patent
Liang et al.

(10) Patent No.: US 9,461,780 B2
(45) Date of Patent: Oct. 4, 2016

(54) METHOD AND APPARATUS FOR TRANSMITTING HYBRID AUTOMATIC REPEAT REQUEST ACKNOWLEDGEMENT INFORMATION

(71) Applicant: ZTE Corporation, Shenzhen (CN)

(72) Inventors: Chunli Liang, Shenzhen (CN); Bin Yu, Shenzhen (CN); Bo Dai, Shenzhen (CN); Weiwei Yang, Shenzhen (CN); Shuqiang Xia, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 85 days.

(21) Appl. No.: 14/388,399

(22) PCT Filed: Apr. 8, 2013

(86) PCT No.: PCT/CN2013/000408
§ 371 (c)(1),
(2) Date: Sep. 26, 2014

(87) PCT Pub. No.: WO2013/152621
PCT Pub. Date: Oct. 17, 2013

(65) Prior Publication Data
US 2015/0117271 A1 Apr. 30, 2015

(30) Foreign Application Priority Data

Apr. 9, 2012 (CN) .......................... 2012 1 0101929

(51) Int. Cl.
| | | |
|---|---|---|
| H04W 4/00 | (2009.01) | |
| H04L 1/18 | (2006.01) | |
| H04L 5/00 | (2006.01) | |
| H04L 5/14 | (2006.01) | |
| H04W 72/04 | (2009.01) | |

(52) U.S. Cl.
CPC ........... *H04L 1/1861* (2013.01); *H04L 1/1812* (2013.01); *H04L 1/1854* (2013.01);
(Continued)

(58) Field of Classification Search
None
See application file for complete search history.

(56) References Cited

U.S. PATENT DOCUMENTS

| | | |
|---|---|---|
| 2011/0243066 A1 | 10/2011 | Nayeb Nazar et al. |
| 2013/0094410 A1* | 4/2013 | Yang .................... H04L 1/1854 370/280 |

FOREIGN PATENT DOCUMENTS

| | | |
|---|---|---|
| CN | 101005691 A | 7/2007 |
| CN | 102075949 A | 5/2011 |

(Continued)

OTHER PUBLICATIONS

International Search Report of PCT/CN2013/000408, dated Jul. 11, 2013.
(Continued)

*Primary Examiner* — Kouroush Mohebbi
(74) *Attorney, Agent, or Firm* — Banner & Witcoff, Ltd.

(57) ABSTRACT

A method and apparatus for transmitting HARQ-ACK information are provided. The method includes: in a CA TDD system, when uplink-downlink configurations of aggregated serving cells are different, and a mode of PUCCH format 1b with channel selection is configured to be used to feed back the HARQ-ACK, determining, according to a timing relationship between the PDSCH and the HARQ-ACK information complied by a secondary serving cell, a set of downlink subframes of aggregated serving cells in a feedback window corresponding to an uplink subframe; and determining, according to the relationship between the sets of downlink subframes of the aggregated serving cells in a feedback window corresponding to uplink subframe, the transmission mode of the HARQ-ACK information of the serving cells and the used PUCCH resources when transmitting the HARQ-ACK information; and on the determined PUCCH resources, transmitting the HARQ-ACK information by using the determined transmission mode of the HARQ-ACK information.

18 Claims, 8 Drawing Sheets

(52) U.S. Cl.
CPC ............ *H04L 5/001* (2013.01); *H04L 5/0055* (2013.01); *H04L 5/14* (2013.01); *H04L 5/1469* (2013.01); *H04W 72/0413* (2013.01)

(56) References Cited

FOREIGN PATENT DOCUMENTS

| CN | 102142941 A | 8/2011 |
|---|---|---|
| EP | 2787675 A1 | 10/2014 |

OTHER PUBLICATIONS

3GPP TSG-RAN WG1 Meeting #68bis, Jeju, Korea, Mar. 26-30, 2012, R1-121379.

3GPP TSG RAN WG1 meeting #68bis, Jeju, Korea, Mar. 26-30, 2012, R1-120971.

3GPP TSG-RAN WG1 #68bis, Jeju, Korea, Mar. 26-30, 2012, R1-121014.

3GPP TS 36.211, V10.4.0 (Dec. 2011)—3rd Generation Partnership Project, Technical Specification Group Radio Access Network, Evolved Universal Terrestrial Radio Access (E-Utra), Physical Channels and Modulation (Release 10).

3GPP TS 36.213 V10.5.0 (Mar. 2012)—3rd Generation Partnership Project, Technical Specification Group Radio Access Network, Evolved Universal Terrestrial Radio Access (E-UTRA), Physical layer procedures (Release 10).

3GPP TSG-RAN WG1 #68bis, Mar. 26-30, 2012, Jeju, Korea, R1-121530.

* cited by examiner

METHOD AND APPARATUS FOR TRANSMITTING HYBRID AUTOMATIC REPEAT REQUEST ACKNOWLEDGEMENT INFORMATION

TECHNICAL FIELD

The patent document relates to the field of communications, and in particular, to a method and apparatus for transmitting Hybrid Automatic Repeat Request Acknowledgement (HARQ-ACK) information.

BACKGROUND OF THE RELATED ART

A radio frame in the Long Term Evolution (LTE for short) system and the LTE-Advanced (LTE-A for short) system comprises a frame structure of a Frequency Division Duplex (FDD for short) mode and a Time Division Duplex (TDD for short) mode.

FIG. 1 is a diagram of a frame structure in the LTE/LTE-A FDD system according to the related art. As shown in FIG. 1, a radio frame of 10 ms is composed of 20 slots with a length of 0.5 ms and numbered from 0 to 19, and slots $2i$ and $2i+1$ constitute a subframe with a length of 1 ms.

FIG. 2 is a diagram of a frame structure in the LTE/LTE-A TDD system according to the related art. As shown in FIG. 2, a radio frame of 10 ms is composed of 2 half frames with a length of 5 ms, a half frame comprises 5 subframes with a length of 1 ms and subframe i is defined as two slots $2i$ and $2i+1$ with a length of 0.5 ms. An uplink-downlink configuration supported in the TDD system is shown in table 1.

TABLE 1

An uplink-downlink configuration supported in the TDD system

| Uplink-downlink configuration | Downlink-uplink transition point period | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Wherein, for each subframe in one radio frame, "D" represents a subframe dedicated to the downlink transmission, "U" represents a subframe dedicated to the uplink transmission, "S" represents a special subframe comprising three parts, i.e., a Downlink Pilot Time Slot (DwPTS for short), a Guard Period (GP for short), and an Uplink Pilot Time Slot (UpPTS for short).

The TDD supports uplink-downlink switching period of 5 ms and 10 ms. If the downlink-uplink transition point period is 5 ms, the special subframe will exist in two half frames; and if the downlink-uplink transition point period is 10 ms, the special subframe only exists in the first half frame. Subframes 0 and 5 and DwPTS are always used to the downlink transmission. The UpPTS and a subframe immediately subsequent to the special subframe are dedicated to the uplink transmission.

In the Hybrid Automatic Repeat Request (HARQ for short) of the LTE system, when there is no Physical Uplink Shared Channel (PUSCH for short) transmission for a User Equipment (UE for short), Hybrid Automatic Repeat Request Acknowledgement (HARQ-ACK for short) information of the Physical Downlink Shared Channel (PDSCH for short) is transmitted on a Physical Uplink Control Channel (PUCCH for short); otherwise, the HARQ-ACK information is transmitted on the PUSCH.

In the LTE TDD system, as the uplink subframes and the downlink subframes are not in a one-to-one correspondence relationship, it means that HARQ-ACK messages of multiple downlink subframes need to be transmitted on the PUCCH channel of one uplink subframe, wherein sets of the downlink subframes corresponding to the uplink subframe constitute a feedback window.

There are two methods for transmitting the HARQ-ACK information.

One method is bundling. The core idea of the method is to perform logic AND operation on the HARQ-ACK messages of transport blocks corresponding to various downlink subframes needed to be fed back on the uplink subframe, and if there are two transport blocks for one downlink subframe, the UE needs to feed back 2-bit HARQ-ACK information, and if there is only one transport block for each subframe, the UE needs to feed back 1-bit HARQ-ACK message.

The other method is multiplexing, which primarily refers to a method of PUCCH format 1b with channel selection in the LTE. The core idea of the method is to represent different feedback states of the downlink subframes needed to be fed back on the uplink subframe by using different PUCCH channels and different modulation symbols on the channels. If there are multiple transport blocks on a downlink subframe, after spatial logic AND (which is also referred to as spatial bundling) is firstly performed on the HARQ-ACK fed back by multiple codeword streams of the downlink subframes, channel selection is performed and the HARQ-ACK is then transmitted by using the PUCCH format 1b. Wherein, the relationship between the HARQ-ACK(i) information of various downlink subframes in the bundling window (that is, the set of downlink subframes needed to be fed back on the uplink subframe) and the selected PUCCH channel and the transmitted 2-bit information is referred to as a mapping table of the channel selection. The mapping tables when the size of the bundling window defined by the existing protocol is 2, 3 and 4 are as shown in the following tables 2-4, wherein M represents the size of the bundling window.

TABLE 2

Mapping table when M = 2

| HARQ-ACK(0), HARQ-ACK(1) | $n_{PUCCH}^{(1)}$ | b(0), b(1) |
|---|---|---|
| ACK, ACK | $n_{PUCCH,1}^{(1)}$ | 1, 1 |
| ACK, NACK/DTX | $n_{PUCCH,0}^{(1)}$ | 0, 1 |
| NACK/DTX, ACK | $n_{PUCCH,1}^{(1)}$ | 0, 0 |
| NACK/DTX, NACK | $n_{PUCCH,1}^{(1)}$ | 1, 0 |
| NACK, DTX | $n_{PUCCH,0}^{(1)}$ | 1, 0 |
| DTX, DTX | | No transmission |

TABLE 3

Mapping table when M = 3

| HARQ-ACK(0), HARQ-ACK(1), HARQ-ACK(2) | $n_{PUCCH}^{(1)}$ | b(0), b(1) |
|---|---|---|
| ACK, ACK, ACK | $n_{PUCCH,2}^{(1)}$ | 1, 1 |
| ACK, ACK, NACK/DTX | $n_{PUCCH,1}^{(1)}$ | 1, 1 |

TABLE 3-continued

Mapping table when M = 3

| HARQ-ACK(0), HARQ-ACK(1), HARQ-ACK(2) | $n_{PUCCH}^{(1)}$ | b(0), b(1) |
|---|---|---|
| ACK, NACK/DTX, ACK | $n_{PUCCH, 0}^{(1)}$ | 1, 1 |
| ACK, NACK/DTX, NACK/DTX | $n_{PUCCH, 0}^{(1)}$ | 0, 1 |
| NACK/DTX, ACK, ACK | $n_{PUCCH, 2}^{(1)}$ | 1, 0 |
| NACK/DTX, ACK, NACK/DTX | $n_{PUCCH, 1}^{(1)}$ | 0, 0 |
| NACK/DTX, NACK/DTX, ACK | $n_{PUCCH, 2}^{(1)}$ | 0, 0 |
| DTX, DTX, NACK | $n_{PUCCH, 2}^{(1)}$ | 0, 1 |
| DTX, NACK, NACK/DTX | $n_{PUCCH, 1}^{(1)}$ | 1, 0 |
| NACK, NACK/DTX, NACK/DTX | $n_{PUCCH, 0}^{(1)}$ | 1, 0 |
| DTX, DTX, DTX | | No transmission |

TABLE 4

Mapping table when M = 4

| HARQ-ACK(0), HARQ-ACK(1), HARQ-ACK(2), HARQ-ACK(3) | $n_{PUCCH}^{(1)}$ | b(0), b(1) |
|---|---|---|
| ACK, ACK, ACK, ACK | $n_{PUCCH, 1}^{(1)}$ | 1, 1 |
| ACK, ACK, ACK, NACK/DTX | $n_{PUCCH, 1}^{(1)}$ | 1, 0 |
| NACK/DTX, NACK/DTX, NACK, DTX | $n_{PUCCH, 2}^{(1)}$ | 1, 1 |
| ACK, ACK, NACK/DTX, ACK | $n_{PUCCH, 1}^{(1)}$ | 1, 0 |
| NACK, DTX, DTX, DTX | $n_{PUCCH, 0}^{(1)}$ | 1, 0 |
| ACK, ACK, NACK/DTX, NACK/DTX | $n_{PUCCH, 1}^{(1)}$ | 1, 0 |
| ACK, NACK/DTX, ACK, ACK | $n_{PUCCH, 3}^{(1)}$ | 0, 1 |
| NACK/DTX, NACK/DTX, NACK/DTX, NACK | $n_{PUCCH, 3}^{(1)}$ | 1, 1 |
| ACK, NACK/DTX, ACK, NACK/DTX | $n_{PUCCH, 2}^{(1)}$ | 0, 1 |
| ACK, NACK/DTX, NACK/DTX, ACK | $n_{PUCCH, 0}^{(1)}$ | 0, 1 |
| ACK, NACK/DTX, NACK/DTX, NACK/DTX | $n_{PUCCH, 0}^{(1)}$ | 1, 1 |
| NACK/DTX, ACK, ACK, ACK | $n_{PUCCH, 3}^{(1)}$ | 0, 1 |
| NACK/DTX, NACK, DTX, DTX | $n_{PUCCH, 1}^{(1)}$ | 0, 0 |
| NACK/DTX, ACK, ACK, NACK/DTX | $n_{PUCCH, 2}^{(1)}$ | 1, 0 |
| NACK/DTX, ACK, NACK/DTX, ACK | $n_{PUCCH, 3}^{(1)}$ | 1, 0 |
| NACK/DTX, ACK, NACK/DTX, NACK/DTX | $n_{PUCCH, 1}^{(1)}$ | 0, 1 |
| NACK/DTX, NACK/DTX, ACK, ACK | $n_{PUCCH, 3}^{(1)}$ | 0, 1 |
| NACK/DTX, NACK/DTX, ACK, NACK/DTX | $n_{PUCCH, 2}^{(1)}$ | 0, 0 |
| NACK/DTX, NACK/DTX, NACK/DTX, ACK | $n_{PUCCH, 3}^{(1)}$ | 0, 0 |
| DTX, DTX, DTX, DTX | | No transmission |

For the PUCCH resources corresponding to various downlink subframes, when there is a Physical Downlink Control Channel (PDCCH) or an SPS release PDCCH corresponding to the PDSCH, the corresponding PUCCH resources thereof are determined according to an implicit mapping relationship with indexes of the Control Channel Element (CCE for short) carrying the PDCCH, while when there is no PDCCH corresponding to the PDSCH, the corresponding PUCCH resources thereof are determined according to a mode of higher layer configuration.

A prominent feature of the LTE-A system relative to the LTE system is that the LTE-A system incorporates a carrier aggregation technology, which aggregates the bandwidth of the LTE system to obtain a larger bandwidth. In the system which incorporates the carrier aggregation, the carriers to be aggregated are referred to as Component Carriers (CC for short), which are also referred to as a serving cell. At the same time, the concept of a Primary Component Carrier/Serving Cell (PCC/PCell for short) and a Secondary Component Carrier/Serving Cell (SCC/SCell for short) are also proposed. In the system in which the carrier aggregation is performed, at least one PCell and one SCell are included, wherein the PCell is always in an activated state. For the TDD system, only serving cells with the same uplink-downlink configuration are supported to be aggregated in the Rel-10 version.

In the LTE-A carrier aggregation system, when the base station configures multiple downlink serving cells for the UE, the UE needs to feed back HARQ-ACK information of transport blocks corresponding to the multiple downlink serving cells. In the LTE-A, when the HARQ-ACK information is transmitted on the physical uplink control channel, two transmission modes are defined, which are a transmission mode of using PUCCH format 1b with channel selection and a transmission mode based on DFT-s-OFDM. As the transmission mode based on DFT-s-OFDM and the channel structures thereof are different from those of PUCCH format 1/1a/1b/2/2a/2b, in the existing LTE-A protocol, the structure is referred to as PUCCH format 3. For a UE configured with multiple serving cells, if the UE can only support aggregation of at most 2 serving cells, when the UE is configured with multiple serving cells, the UE will transmit the HARQ-ACK by using a mode of PUCCH format 1b with channel selection. If the UE can support aggregation of more than 2 serving cells, when the UE is configured with multiple serving cells, the base station will further configure through the higher layer signaling whether the UE uses a mode of PUCCH format 1b with channel selection or a PUCCH format 3 to transmit the HARQ-ACK information.

In order to be distinguished from the LTE-A system, the PUCCH format 1b with channel selection defined in the above LTE system is referred to as the PUCCH format 1b with channel selection under a single serving cell, and the PUCCH format 1b with channel selection of the LTE-A system is referred to as the PUCCH format 1b with channel selection during carrier aggregation (also referred to as the PUCCH format 1b with channel selection when multiple serving cells are configured).

In the LTE-A TDD system, when 2 serving cells are configured, the HARQ-ACK information is transmitted by using the mode of PUCCH format 1b with channel selection, and the number of the corresponding downlink subframes is M=1, the transmitted HARQ-ACK information is Acknowledgement (ACK)/Negative Acknowledgement (NACK)/Discontinuous Transmission (DTX) feedback of PDCCH indicating the SPS release or transport blocks of each serving cell, and the mapping tables of the corresponding channel selection thereof are as shown in tables 5-7, wherein the correspondence relationship between the size of A and the HARQ-ACK information of the configured serving cell is as shown in table 8; when 2 serving cells are configured, the HARQ-ACK information is transmitted by using the mode of PUCCH format 1b with channel selection and the number of the corresponding downlink subframes is M=2, the HARQ-ACK information is ACK/NACK/DTX feedback of the PDSCH or PDCCH indicating the SPS release of each serving cell, that is, if the PDSCH corresponds to 2 transport blocks, the HARQ-ACK information of the PDSCH is obtained by performing spatial bundling on the HARQ-ACK information of two transport blocks, and the mapping table of the corresponding channel selection thereof is as shown in table 7, wherein the correspondence relationship between the size of A and the HARQ-ACK information of the configured serving cell is as shown in table 9; and when 2 serving cells are configured, the HARQ-ACK information is transmitted by using the mode of PUCCH format 1b with channel selection, and the number of the corresponding downlink subframes is M>2, the HARQ-ACK information fed back by each serving cell has at most two bits, which is obtained by firstly performing spatial bundling and then performing time-domain bundling on the ACK/NACK/DTX response of all transport blocks of each serving cell, and the mapping tables of the corresponding channel selection thereof are as shown in tables 10 and 11.

TABLE 5

Mapping table when A = 2 (M = 1)

| HARQ-ACK(0), HARQ-ACK(1) | $n_{PUCCH}^{(1)}$ | b(0)b(1) |
|---|---|---|
| ACK, ACK | $n_{PUCCH,1}^{(1)}$ | 1, 0 |
| ACK, NACK/DTX | $n_{PUCCH,0}^{(1)}$ | 1, 1 |
| NACK/DTX, ACK | $n_{PUCCH,1}^{(1)}$ | 0, 1 |
| NACK, NACK/DTX | $n_{PUCCH,0}^{(1)}$ | 0, 0 |
| DTX, NACK/DTX | | No transmission |

TABLE 6

Mapping table when A = 3 (M = 1)

| HARQ-ACK(0), HARQ-ACK(1), HARQ-ACK(2) | $n_{PUCCH}^{(1)}$ | b(0)b(1) |
|---|---|---|
| ACK, ACK, ACK | $n_{PUCCH,2}^{(1)}$ | 1, 1 |
| ACK, ACK, NACK/DTX | $n_{PUCCH,1}^{(1)}$ | 1, 0 |
| ACK, NACK/DTX, ACK | $n_{PUCCH,2}^{(1)}$ | 1, 0 |
| ACK, NACK/DTX, NACK/DTX | $n_{PUCCH,0}^{(1)}$ | 1, 1 |
| NACK/DTX, ACK, ACK | $n_{PUCCH,2}^{(1)}$ | 0, 1 |
| NACK/DTX, ACK, NACK/DTX | $n_{PUCCH,1}^{(1)}$ | 0, 1 |
| NACK/DTX, NACK/DTX, ACK | $n_{PUCCH,2}^{(1)}$ | 0, 0 |
| NACK, NACK/DTX, NACK/DTX | $n_{PUCCH,0}^{(1)}$ | 0, 0 |
| DTX, NACK/DTX, NACK/DTX | | No transmission |

TABLE 7

Mapping table when A = 4 (M = 1 or 2)

| HARQ-ACK(0), HARQ-ACK(1), HARQ-ACK(2), HARQ-ACK(3) | $n_{PUCCH}^{(1)}$ | b(0)b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,2}^{(1)}$ | 1, 1 |
| ACK, ACK, NACK/DTX, ACK | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 1, 1 |
| ACK, NACK/DTX, ACK, NACK/DTX | $n_{PUCCH,2}^{(1)}$ | 1, 0 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,1}^{(1)}$ | 0, 0 |
| NACK/DTX, ACK, ACK, NACK/DTX | $n_{PUCCH,2}^{(1)}$ | 0, 1 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| NACK, NACK/DTX, NACK/DTX, NACK/DTX | $n_{PUCCH,0}^{(1)}$ | 0, 0 |
| DTX, NACK/DTX, NACK/DTX, NACK/DTX | | No transmission |

TABLE 8

Relationship between A and HARQ-ACK information of a serving cell (when M = 1)

| | HARQ-ACK(j) | | | |
|---|---|---|---|---|
| A | HARQ-ACK(0) | HARQ-ACK(1) | HARQ-ACK(2) | HARQ-ACK(3) |
| 2 | TB1 Primary cell | TB1 Secondary cell | NA | NA |
| 3 | TB1 Serving cell1 | TB2 Serving cell1 | TB1 Serving cell2 | NA |
| 4 | TB1 Primary cell | TB2 Primary cell | TB1 Secondary cell | TB2 Secondary cell |

TABLE 9

Relationship between A and HARQ-ACK information of a serving cell (when M = 1)

| | HARQ-ACK(j) | | | |
|---|---|---|---|---|
| A | HARQ-ACK(0) | HARQ-ACK(1) | HARQ-ACK(2) | HARQ-ACK(3) |
| 4 | The first subframe of Primary cell | The second subframe of Primary cell | The first subframe of Secondary cell | The second subframe of Secondary cell |

TABLE 10

Mapping table when M = 3

| Primary serving cells | Secondary serving cells | Resources | Constellation points | Encoded input bit |
|---|---|---|---|---|
| HARQ-ACK(0), HARQ-ACK(1), HARQ-ACK(2) | HARQ-ACK(0), HARQ-ACK(1), HARQ-ACK(2) | $n_{PUCCH}^{(1)}$ | b(0), b(1) | o(0), o(1), o(2), o(3) |
| ACK, ACK, ACK | ACK, ACK, ACK | $n_{PUCCH,1}^{(1)}$ | 1, 1 | 1, 1, 1, 1 |
| ACK, ACK, NACK/DTX | ACK, ACK, ACK | $n_{PUCCH,1}^{(1)}$ | 0, 0 | 1, 0, 1, 1 |
| ACK, NACK/DTX, any | ACK, ACK, ACK | $n_{PUCCH,3}^{(1)}$ | 1, 1 | 0, 1, 1, 1 |
| NACK/DTX, any, any | ACK, ACK, ACK | $n_{PUCCH,3}^{(1)}$ | 0, 1 | 0, 0, 1, 1 |
| ACK, ACK, ACK | ACK, ACK, NACK/DTX | $n_{PUCCH,0}^{(1)}$ | 1, 0 | 1, 1, 1, 0 |
| ACK, ACK, NACK/DTX | ACK, ACK, NACK/DTX | $n_{PUCCH,3}^{(1)}$ | 1, 0 | 1, 0, 1, 0 |
| ACK, NACK/DTX, any | ACK, ACK, NACK/DTX | $n_{PUCCH,0}^{(1)}$ | 0, 1 | 0, 1, 1, 0 |
| NACK/DTX, any, any | ACK, ACK, NACK/DTX | $n_{PUCCH,3}^{(1)}$ | 0, 0 | 0, 0, 1, 0 |
| ACK, ACK, ACK | ACK, NACK/DTX, any | $n_{PUCCH,2}^{(1)}$ | 1, 1 | 1, 1, 0, 1 |

TABLE 10-continued

Mapping table when M = 3

| Primary serving cells | Secondary serving cells | Resources | Constellation points | Encoded input bit |
|---|---|---|---|---|
| ACK, ACK, NACK/DTX | ACK, NACK/DTX, any | $n_{PUCCH,2}^{(1)}$ | 0, 1 | 1, 0, 0, 1 |
| ACK, NACK/DTX, any | ACK, NACK/DTX, any | $n_{PUCCH,2}^{(1)}$ | 1, 0 | 0, 1, 0, 1 |
| NACK/DTX, any, any | ACK, NACK/DTX, any | $n_{PUCCH,2}^{(1)}$ | 0, 0 | 0, 0, 0, 1 |
| ACK, ACK, ACK | NACK/DTX, any, any | $n_{PUCCH,1}^{(1)}$ | 1, 0 | 1, 1, 0, 0 |
| ACK, ACK, NACK/DTX | NACK/DTX, any, any | $n_{PUCCH,1}^{(1)}$ | 0, 1 | 1, 0, 0, 0 |
| ACK, NACK/DTX, any | NACK/DTX, any, any | $n_{PUCCH,0}^{(1)}$ | 1, 1 | 0, 1, 0, 0 |
| NACK, any, any | NACK/DTX, any, any | $n_{PUCCH,0}^{(1)}$ | 0, 0 | 0, 0, 0, 0 |
| DTX, any, any | NACK/DTX, any, any | No transmission | | 0, 0, 0, 0 |

TABLE 11

Mapping table when M = 4

| Primary serving cells | Secondary serving cells | Resources | Constellation points | Encoded bit input |
|---|---|---|---|---|
| HARQ-ACK(0), HARQ-ACK(1), HARQ-ACK(2), HARQ-ACK(3) | HARQ-ACK(0), HARQ-ACK(1), HARQ-ACK(2), HARQ-ACK(3) | $n_{PUCCH}^{(1)}$ | b(0), b(1) | o(0), o(1), o(2), o(3) |
| ACK, ACK, ACK, NACK/DTX | ACK, ACK, ACK, NACK/DTX | $n_{PUCCH,1}^{(1)}$ | 1, 1 | 1, 1, 1, 1 |
| ACK, ACK, NACK/DTX, any | ACK, ACK, ACK, NACK/DTX | $n_{PUCCH,1}^{(1)}$ | 0, 0 | 1, 0, 1, 1 |
| ACK, DTX, DTX, DTX | ACK, ACK, ACK, NACK/DTX | $n_{PUCCH,3}^{(1)}$ | 1, 1 | 0, 1, 1, 1 |
| ACK, ACK, ACK, ACK | ACK, ACK, ACK, NACK/DTX | $n_{PUCCH,3}^{(1)}$ | 1, 1 | 0, 1, 1, 1 |
| NACK/DTX, any, any, any | ACK, ACK, ACK, NACK/DTX | $n_{PUCCH,3}^{(1)}$ | 0, 1 | 0, 0, 1, 1 |
| (ACK, NACK/DTX, any, any), except for (ACK, DTX, DTX, DTX) | ACK, ACK, ACK, NACK/DTX | $n_{PUCCH,3}^{(1)}$ | 0, 1 | 0, 0, 1, 1 |
| ACK, ACK, ACK, NACK/DTX | ACK, ACK, NACK/DTX, any | $n_{PUCCH,0}^{(1)}$ | 1, 0 | 1, 1, 1, 0 |
| ACK, ACK, NACK/DTX, any | ACK, ACK, NACK/DTX, any | $n_{PUCCH,3}^{(1)}$ | 1, 0 | 1, 0, 1, 0 |
| ACK, DTX, DTX, DTX | ACK, ACK, NACK/DTX, any | $n_{PUCCH,0}^{(1)}$ | 0, 1 | 0, 1, 1, 0 |
| ACK, ACK, ACK, ACK | ACK, ACK, NACK/DTX, any | $n_{PUCCH,0}^{(1)}$ | 0, 1 | 0, 1, 1, 0 |
| NACK/DTX, any, any, any | ACK, ACK, NACK/DTX, any | $n_{PUCCH,3}^{(1)}$ | 0, 0 | 0, 0, 1, 0 |
| (ACK, NACK/DTX, any, any), except for (ACK, DTX, DTX, DTX) | ACK, ACK, NACK/DTX, any | $n_{PUCCH,3}^{(1)}$ | 0, 0 | 0, 0, 1, 0 |
| ACK, ACK, ACK, NACK/DTX | ACK, DTX, DTX, DTX | $n_{PUCCH,2}^{(1)}$ | 1, 1 | 1, 1, 0, 1 |
| ACK, ACK, ACK, NACK/DTX | ACK, ACK, ACK, ACK | $n_{PUCCH,2}^{(1)}$ | 1, 1 | 1, 1, 0, 1 |

TABLE 11-continued

Mapping table when M = 4

| Primary serving cells | Secondary serving cells | Resources | Constellation points | Encoded bit input |
|---|---|---|---|---|
| ACK, ACK, NACK/DTX, any | ACK, DTX, DTX, DTX | $n_{PUCCH,2}^{(1)}$ | 0, 1 | 1, 0, 0, 1 |
| ACK, ACK, NACK/DTX, any | ACK, ACK, ACK, ACK | $n_{PUCCH,2}^{(1)}$ | 0, 1 | 1, 0, 0, 1 |
| ACK, DTX, DTX, DTX | ACK, DTX, DTX, DTX | $n_{PUCCH,2}^{(1)}$ | 1, 0 | 0, 1, 0, 1 |
| ACK, DTX, DTX, DTX | ACK, ACK, ACK, ACK | $n_{PUCCH,2}^{(1)}$ | 1, 0 | 0, 1, 0, 1 |
| ACK, ACK, ACK, ACK | ACK, DTX, DTX, DTX | $n_{PUCCH,2}^{(1)}$ | 1, 0 | 0, 1, 0, 1 |
| ACK, ACK, ACK, ACK | ACK, ACK, ACK, ACK | $n_{PUCCH,2}^{(1)}$ | 1, 0 | 0, 1, 0, 1 |
| NACK/DTX, any, any, any | ACK, DTX, DTX, DTX | $n_{PUCCH,2}^{(1)}$ | 0, 0 | 0, 0, 0, 1 |
| NACK/DTX, any, any, any | ACK, ACK, ACK, ACK | $n_{PUCCH,2}^{(1)}$ | 0, 0 | 0, 0, 0, 1 |
| (ACK, NACK/DTX, any, any), except for (ACK, DTX, DTX, DTX) | ACK, DTX, DTX, DTX | $n_{PUCCH,2}^{(1)}$ | 0, 0 | 0, 0, 0, 1 |
| (ACK, NACK/DTX, any, any), except for (ACK, DTX, DTX, DTX) | ACK, ACK, ACK, ACK | $n_{PUCCH,2}^{(1)}$ | 0, 0 | 0, 0, 0, 1 |
| ACK, ACK, ACK, NACK/DTX | NACK/DTX, any, any, any | $n_{PUCCH,1}^{(1)}$ | 1, 0 | 1, 1, 0, 0 |
| ACK, ACK, ACK, NACK/DTX | (ACK, NACK/DTX, any, any), except for (ACK, DTX, DTX, DTX) | $n_{PUCCH,1}^{(1)}$ | 1, 0 | 1, 1, 0, 0 |
| ACK, ACK, NACK/DTX, any | NACK/DTX, any, any, any | $n_{PUCCH,1}^{(1)}$ | 0, 1 | 1, 0, 0, 0 |
| ACK, ACK, NACK/DTX, any | (ACK, NACK/DTX, any, any), except for (ACK, DTX, DTX, DTX) | $n_{PUCCH,1}^{(1)}$ | 0, 1 | 1, 0, 0, 0 |
| ACK, DTX, DTX, DTX | NACK/DTX, any, any, any | $n_{PUCCH,0}^{(1)}$ | 1, 1 | 0, 1, 0, 0 |
| ACK, DTX, DTX, DTX | (ACK, NACK/DTX, any, any), except for (ACK, DTX, DTX, DTX) | $n_{PUCCH,0}^{(1)}$ | 1, 1 | 0, 1, 0, 0 |
| ACK, ACK, ACK, ACK | NACK/DTX, any, any, any | $n_{PUCCH,0}^{(1)}$ | 1, 1 | 0, 1, 0, 0 |
| ACK, ACK, ACK, ACK | (ACK, NACK/DTX, any, any), except for (ACK, DTX, DTX, DTX) | $n_{PUCCH,0}^{(1)}$ | 1, 1 | 0, 1, 0, 0 |
| NACK, any, any, any | NACK/DTX, any, any, any | $n_{PUCCH,0}^{(1)}$ | 0, 0 | 0, 0, 0, 0 |
| NACK, any, any, any | (ACK, NACK/DTX, any, any), except for (ACK, DTX, DTX, DTX) | $n_{PUCCH,0}^{(1)}$ | 0, 0 | 0, 0, 0, 0 |
| (ACK, NACK/DTX, any, any) except for (ACK, DTX, DTX, DTX) | NACK/DTX, any, any, any | $n_{PUCCH,0}^{(1)}$ | 0, 0 | 0, 0, 0, 0 |
| (ACK, NACK/DTX, any, any) except for (ACK, DTX, DTX, DTX) | (ACK, NACK/DTX, any, any), except for (ACK, DTX, DTX, DTX) | $n_{PUCCH,0}^{(1)}$ | 0, 0 | 0, 0, 0, 0 |
| DTX, any, any, any | NACK/DTX, any, any, any | No transmission | | 0, 0, 0, 0 |
| DTX, any, any, any | (ACK, NACK/DTX, any, any), except for (ACK, DTX, DTX, DTX) | No transmission | | 0, 0, 0, 0 |

When the HARQ-ACK information is transmitted by using a mode of PUCCH format 1b with channel selection, the corresponding PUCCH resources thereof (i.e., the determination of the indexes of the PUCCH resources) are determined by using the following mode:

when M=1, when the PDCCH corresponding to the PDSCH is transmitted in a primary serving cell, the PUCCH resources corresponding to the first transport block are determined according to an implicit mapping relationship with the indexes of the CCEs of the PDCCH, wherein the PDCCH here is the PDCCH corresponding to the PDSCH. Specifically, the channel index corresponding to the PUCCH is determined according to the indexes of the Control Channel Elements (CCEs) where the PDCCH is located (the protocol is represented by using an equation); and if the transmission mode of the serving cell corresponding to the PDCCH is configured as a transmission mode supporting two transmission blocks, the PUCCH resource corresponding to the second transport block has an index equal to an index value of the PUCCH resource corresponding to the first transport block plus 1;

when the PDCCH corresponding to the PDSCH is transmitted in a secondary serving cell, the PUCCH resources corresponding to the secondary serving cell are obtained by using a mode of higher layer configuration with indication of a resource indication value in the PDCCH (the Transmission Power Control (TPC) domain in the Downlink Control Information (DCI) carried on the PDCCH is used). If the transmission mode of the secondary serving cell is configured as a transmission mode supporting two transmission blocks, the resource indication value in the PUCCH corresponds to two PUCCH resources of the higher layer configuration; otherwise, the resource indication value in the PDCCH corresponds to one PUCCH resource of the higher layer configuration;

when there is no PDCCH corresponding to the PDSCH of the primary serving cell, the corresponding PUCCH resources thereof are determined according to the mode of higher layer configuration;

when M=2, when the PDCCH corresponding to the PDSCH is transmitted in a primary serving cell, the PUCCH resources corresponding to the PDSCH are determined according to an implicit mapping relationship with the indexes of the CCEs of the PDCCH, when the PDCCH corresponding to the PDSCH is transmitted in a secondary serving cell, the two PUCCH resources corresponding to the secondary serving cell are obtained by using a mode of higher layer configuration with indication of a resource indication value in the PDCCH (the Transmission Power Control (TPC) domain in the Downlink Control Information (DCI) carried on the PDCCH is used), and the resource indication value in the PDCCH corresponds to two PUCCH resources of the higher layer configuration;

when there is no PDCCH corresponding to the PDSCH of the primary serving cell, the corresponding PUCCH resources thereof are determined according to the mode of higher layer configuration;

when M=3 and 4, for the primary serving cell:

when there is PDSCH transmission without a corresponding PDCCH, for two PUCCH resources $n_{PUCCH,0}^{(1)}$ and $n_{PUCCH,1}^{(1)}$ corresponding to the primary serving cell, $n_{PUCCH,0}^{(1)}$ therein is determined according to a mode of higher layer configuration, while $n_{PUCCH,1}^{(1)}$ is determined according to an implicit mapping relationship with the indexes of CCEs of the PDCCH with a Downlink Assignment Indicator (DAI for short) value being 1; otherwise, two PUCCH resources $n_{PUCCH,0}^{(1)}$ and $n_{PUCCH,1}^{(1)}$ corresponding to the primary serving cell are determined according to an implicit mapping relationship with the indexes of CCEs of the PDCCH with DAI values being 1 and 2 respectively;

for the secondary serving cell:

when the PDCCH corresponding to the PDSCH is transmitted on the primary serving cell, two PUCCH resources $n_{PUCCH,2}^{(1)}$ and $n_{PUCCH,3}^{(1)}$ corresponding to the secondary serving cell are determined according to an implicit mapping relationship with indexes of CCEs of the PDCCH with DAI values being 1 and 2 respectively;

when the PDCCH corresponding to the PDSCH is transmitted in a secondary serving cell, the two PUCCH resources $n_{PUCCH,2}^{(1)}$ and $n_{PUCCH,3}^{(1)}$ corresponding to the secondary serving cell are obtained by using a mode of higher layer configuration with indication of a resource indication value in the PDCCH (the Transmission Power Control (TPC) domain in the Downlink Control Information (DCI) carried on the PDCCH is used), and the resource indication value in the PDCCH corresponds to two PUCCH resources of the higher layer configuration.

In the discussion of the subsequent versions, it needs to support aggregation of serving cells with different uplink-downlink configurations. When the serving cells with different uplink-downlink configurations are aggregated, there is currently the following conclusion of the timing relationship between the PDSCH and the corresponding HARQ-ACK information of various aggregated serving cells:

1. The HARQ-ACK information of the PDSCH of the serving cells participating in the aggregation can only be transmitted on the primary uplink serving cell;

2. The timing relationship between the PDSCH and the corresponding HARQ-ACK information of the primary serving cell remains unchanged;

3. When the downlink subframes of the secondary serving cell is a subset of the downlink subframes of the primary serving cell, the timing relationship between the PDSCH of various downlink subframes and the corresponding HARQ-ACK information of the secondary serving cell remains the same as that of the primary serving cell, and other conditions need to be further considered.

FIG. 3 illustrates a diagram of the above conclusion 3. In FIG. 3, the serving cell using the uplink-downlink configuration #1 and the serving cell using the uplink-downlink configuration #0 are aggregated, and the serving cell using the uplink-downlink configuration #1 is configured as a primary serving cell, and the serving cell using the uplink-downlink configuration #0 is a secondary serving cell. As the set of downlink subframes of the primary serving cell is {0,1,4,5,6,9} and the set of downlink subframes of the secondary serving cell is {0,1,5,6}, it means the set of downlink subframes of the secondary serving cell is a subset of the set of downlink subframes of the primary serving cell. Therefore, at this time, the timing relationship between the PDSCH on various downlink subframes and the corresponding HARQ-ACK of the secondary serving cell will not be in accordance with the timing relationship defined by the secondary serving cell itself any more, and instead, it uses the timing relationship between the PDSCH and the HARQ-ACK of the primary serving cell (that is, the configuration #1). As an example, for the PDSCH on the downlink subframe #0 of the secondary serving cell, the corresponding HARQ-ACK information thereof is not transmitted on the uplink subframe #4 any more, and instead, transmitted on the uplink subframe #7.

As described above, during the carrier aggregation, the HARQ-ACK information can be transmitted by using a mode of PUCCH format 1b with channel selection. In the existing standard, only how to transmit the HARQ-ACK by using the PUCCH format 1b with channel selection when the serving cells with the same uplink-downlink configuration are aggregated is regulated. While when the serving cells with different uplink-downlink configurations are aggregated, no corresponding regulation is made in the existing technology.

At present, when the serving cells with different uplink-downlink configurations are aggregated, there are still the following problems unsolved when the HARQ-ACK is transmitted by using a mode of PUCCH format 1b with channel selection:

selection and determination of the mapping table;
determination of the HARQ-ACK state of the serving cell in the mapping table;
determination of the PUCCH resources.

SUMMARY OF THE INVENTION

The embodiments of the patent document provide a method and apparatus for transmitting HARQ-ACK information, to solve the problem that the PUCCH resources can not be determined when carrier aggregation is performed on serving cells with different uplink-downlink configurations and a mode of PUCCH format 1b with channel selection is configured to feed back the HARQ-ACK.

The embodiments of the patent document provide a method for transmitting Hybrid Automatic Repeat Request Acknowledgement (HARQ-ACK) information, comprising:

in a Carrier Aggregation (CA) Time Division Duplex (TDD) system, aggregated serving cells comprise primary serving cells and secondary serving cells, and when uplink-downlink configurations of aggregated serving cells are different and a mode of Physical Uplink Control Channel (PUCCH) format 1b with channel selection is configured to be used to feed back the HARQ-ACK, determining, according to a timing relationship between the Physical Downlink Shared Channel (PDSCH) and the HARQ-ACK information complied by the secondary serving cell, a set of downlink subframes of the aggregated serving cells in a feedback window corresponding to an uplink subframe;

determining, according to a relationship between the set of downlink subframes of the aggregated serving cells in the feedback window corresponding to the uplink subframe, a transmission mode of the HARQ-ACK information and used PUCCH resources when transmitting the HARQ-ACK information; and transmitting the HARQ-ACK information on the determined PUCCH resources by using the determined transmission mode of the HARQ-ACK information.

Preferably, the timing relationship between the PDSCH and the HARQ-ACK information of the secondary serving cell is determined by the following mode:

when the set of downlink subframes under the uplink-downlink configuration of the secondary serving cell is a subset of a set of downlink subframes under the uplink-downlink configuration of a primary serving cell, the timing relationship between the PDSCH and the HARQ-ACK information of the secondary serving cell complying with a timing relationship between a PDSCH and HARQ-ACK information corresponding to the primary serving cell;

otherwise, when the set of downlink subframes under the uplink-downlink configuration of the secondary serving cell is not a subset of the set of downlink subframes under the uplink-downlink configuration of the primary serving cell, the timing relationship between the PDSCH and the HARQ-ACK information of the secondary serving cell complying with the timing relationship between the PDSCH and the HARQ-ACK information corresponding to the primary serving cell or complying with a timing relationship between the PDSCH and the HARQ-ACK information corresponding to the secondary serving cell, or complying with a timing relationship between a PDSCH and a HARQ corresponding to a reference uplink-downlink configuration X; wherein, the reference uplink-downlink configuration X is an uplink-downlink configuration with a minimum set of downlink subframes in the uplink-downlink configurations satisfying the following conditions: the set of uplink subframes under the uplink-downlink configuration is not only a subset of the set of uplink subframes under the uplink-downlink configuration of the primary serving cell, but also a subset of the set of uplink subframes under the uplink-downlink configuration of the secondary serving cell.

Preferably, determining, according to the relationship between the set of downlink subframes of the aggregated serving cells in a feedback window corresponding to the uplink subframe, the transmission mode of the HARQ-ACK information of the aggregated serving cells and the used PUCCH resources when transmitting the HARQ-ACK information specifically comprises:

when the set of downlink subframes of the secondary serving cell corresponding to the uplink subframe is not a null set and the set of downlink subframes of the primary serving cell corresponding to the uplink subframe is a null set, transmitting the HARQ-ACK information corresponding to the PDSCH of the secondary serving cell by using a mode of PUCCH format 1a or PUCCH format 1b, wherein PUCCH resources needed to transmit the HARQ-ACK information are determined by using a mode of higher layer configuration with dynamic indication signaling, or the PUCCH resources needed to transmit the HARQ-ACK information are determined only by using a mode of higher layer configuration; or transmitting the HARQ-ACK information corresponding to the PDSCH of the serving cells by using a mode of PUCCH format 1b with channel selection when the TDD system configures multiple serving cells, wherein a mapping table used during the PUCCH format 1b with channel selection is determined according to the size of a set of downlink subframes ($K_s$) of the secondary serving cell corresponding to the uplink subframe, the HARQ-ACK information of the primary serving cell in the mapping table is set as a Discontinuous Transmission (DTX) state, and the PUCCH resources corresponding to the secondary serving cell are determined by using a mode of higher layer configuration with dynamic indication signaling; or transmitting the HARQ-ACK information corresponding to the PDSCH of the secondary serving cell by using a mode of PUCCH format 1b with channel selection when the TDD system configures a single serving cell, wherein a mapping table used during the PUCCH format 1b with channel selection is determined according to the size of the set of downlink subframes ($K_s$) of the secondary serving cell corresponding to the uplink subframe, and the PUCCH resources corresponding to the downlink subframes corresponding to uplink subframe of the secondary serving cell are determined by using a mode of higher layer configuration with dynamic indication signaling; or determining the transmission mode of the HARQ-ACK information according to the size of the set of downlink subframes ($K_s$) of the secondary serving cell corresponding to the uplink subframe by using one of the following modes: a mode of PUCCH format 1a, a mode of PUCCH format 1b, a mode of PUCCH format 1b with channel selection when the TDD system configures multiple serving cells, or a mode of PUCCH format 1b with channel selection when the TDD system configures a single serving cell.

Preferably, determining the transmission mode of the HARQ-ACK information according to the size of $K_s$ specifically comprises:

when the number of elements comprised in $K_s$ is 1 or 2, transmitting the HARQ-ACK information corresponding to the PDSCH of the secondary serving cell by using a mode of PUCCH format 1a or PUCCH format 1b; and when the number of elements comprised in $K_s$ is more than 2, transmitting the HARQ-ACK information corresponding to the PDSCH of the serving cell by using a mode of PUCCH format 1b with channel selection when the TDD system configures multiple serving cells or a single serving cell; or when the number of elements comprised in $K_s$ is 1, transmitting the HARQ-ACK information corresponding to the PDSCH of the secondary serving cell by using a mode of PUCCH format 1a or PUCCH format 1b; and when the number of elements comprised in $K_s$ is more than 1, transmitting the HARQ-ACK information corresponding to the PDSCH of the serving cell by using a mode of PUCCH format 1b with channel selection when the TDD system configures multiple serving cells or a single serving cell.

Preferably, if it is determined that the HARQ-ACK information corresponding to the PDSCH of the secondary serving cell is transmitted by using a mode of PUCCH format 1a or PUCCH format 1b, when $K_s$ only comprises one element, i.e., the uplink subframes need to feed back HARQ-ACK information corresponding to the PDSCH of one downlink subframe of the secondary serving cell, if the secondary serving cell is configured to only comprise a transmission mode of one transport block, transmitting the HARQ-ACK information corresponding to the PDSCH of the secondary serving cell by using a mode of PUCCH format 1a, and if the secondary serving cell is configured to at most support a transmission mode of two transport blocks, transmitting the HARQ-ACK information corresponding to the PDSCH of the secondary serving cell by using a mode of PUCCH format 1b;

when $K_s$ comprises two elements, i.e., the uplink subframes need to feed back the HARQ-ACK information of two downlink subframes of the secondary serving cell, obtaining 2-bit HARQ-ACK information corresponding to the two downlink subframes after performing spatial bundling on the HARQ-ACK information of the two downlink subframes, and transmitting the 2-bit HARQ-ACK information by using a mode of PUCCH format 1b; and when $K_s$ comprises more than two elements, i.e., the uplink subframes need to feed back HARQ-ACK information of more than two downlink subframes of the secondary serving cell, obtaining 2-bit HARQ-ACK information after performing spatial bundling and then time-domain bundling operation on the HARQ-ACK information of the multiple downlink subframes, and then transmitting the 2-bit HARQ-ACK information by using a mode of PUCCH format 1b.

Preferably, if it is determined that the HARQ-ACK information corresponding to the PDSCH of the serving cell is transmitted by using a mode of PUCCH format 1b with channel selection when the TDD system configures multiple serving cells, when $K_s$ only comprises one element, i.e., the uplink subframes need to feed back HARQ-ACK information of one downlink subframe of the secondary serving cell, if the secondary serving cell is configured to only comprise a transmission mode of one transport block, using a channel selection mapping table of A=2 during the carrier aggregation of the TDD system, setting the HARQ-ACK information corresponding to the primary serving cell as DTX, and obtaining one PUCCH resource corresponding to the second serving cell by using a mode of higher layer configuration with dynamic indication signaling; and if the secondary serving cell is configured to support a transmission mode of two transport blocks, using a channel selection mapping table of A=3 during the carrier aggregation of the TDD system, setting the HARQ-ACK information corresponding to the primary serving cell as DTX, and determining two PUCCH resources corresponding to the second serving cell by using a mode of higher layer configuration with dynamic indication signaling;

when $K_s$ comprises two elements, i.e., the uplink subframes need to feed back HARQ-ACK information of two downlink subframes of the secondary serving cell, obtaining 2-bit HARQ-ACK information corresponding to the two downlink subframes after performing spatial bundling on the HARQ-ACK information of the two downlink subframes, using a channel selection mapping table of A=4 during the carrier aggregation of the TDD system, setting the HARQ-ACK information corresponding to the primary serving cell as DTX, and determining two PUCCH resources corresponding to the second serving cell by using a mode of higher layer configuration with dynamic indication signaling;

when $K_s$ comprises more than two elements, i.e., the uplink subframes need to feed back HARQ-ACK information of more than two downlink subframes of the secondary serving cell, obtaining 2-bit HARQ-ACK information after performing spatial bundling and then time-domain bundling operation on the HARQ-ACK information of the multiple downlink subframes, then transmitting the 2-bit HARQ-ACK information by using the PUCCH format 1b, using a channel selection mapping table of M=3 or M=4 (M is the size of $K_s$) during the carrier aggregation of the TDD system, setting the HARQ-ACK information corresponding to the primary serving cell as DTX, and determining two PUCCH resources corresponding to the second serving cell by using a mode of higher layer configuration with dynamic indication signaling.

Preferably, if it is determined that the HARQ-ACK information corresponding to the PDSCH of the secondary serving cell is transmitted by using a mode of PUCCH format 1b with channel selection when the TDD system configures a single serving cell, when $K_s$ only comprises one element, i.e., the uplink subframes need to feed back HARQ-ACK information of one downlink subframe of the secondary serving cell, if the secondary serving cell is configured to only comprise a transmission mode of one transport block, transmitting the HARQ-ACK information corresponding to the PDSCH of the secondary serving cell by using a mode of PUCCH format 1a, and if the secondary serving cell is configured to at most support a transmission mode of two transport blocks, transmitting the HARQ-ACK information corresponding to the PDSCH of the secondary serving cell by using a mode of PUCCH format 1b; and determining the corresponding PUCCH resources by using a mode of higher layer configuration with dynamic indication signaling when transmitting the HARQ-ACK information; and when $K_s$ comprises more than one element, i.e., the uplink subframes need to feed back HARQ-ACK information of more than one downlink subframe of the secondary serving cell, obtaining M-bit (M is the size of $K_s$) HARQ-ACK information corresponding to the downlink subframes after performing spatial bundling on the HARQ-ACK information of the downlink subframes, using a channel selection mapping table of M=2, M=3 or M=4 during a single service of the TDD system, and determining PUCCH resources corresponding to the downlink subframes corresponding to the uplink subframe of the second serving cell by using a mode of higher layer configuration with dynamic indication signaling.

Preferably, determining, according to the relationship between the set of downlink subframes of the aggregated serving cells in a feedback window corresponding to uplink subframe, the transmission mode of the HARQ-ACK information of the serving cells and the used PUCCH resources when transmitting the HARQ-ACK information specifically comprises:

when the set of downlink subframes ($K_s$) of the secondary serving cell corresponding to the uplink subframe is not a null set, the set of downlink subframes ($K_p$) of the primary serving cell corresponding to the uplink subframe is also not a null set, and an intersection set between $K_s$ and $K_p$ is a null set, transmitting the HARQ-ACK information by using a mode of PUCCH format 1b with channel selection when the TDD system configures multiple serving cells, wherein the mapping table used during the PUCCH format 1b with channel selection is determined according to one with a larger size in sets of $K_s$ and $K_p$, the HARQ-ACK information without corresponding downlink subframes in the mapping table is set as a DTX state, and the PUCCH resources corresponding to the secondary serving cell are determined by using a mode of higher layer configuration with dynamic indication signaling.

Preferably, determining, according to the relationship between the set of downlink subframes of the aggregated serving cells in a feedback window corresponding to uplink subframe, the transmission mode of the HARQ-ACK information of the serving cells and the used PUCCH resources when transmitting the HARQ-ACK information specifically comprises:

when the set of downlink subframes ($K_s$) of the secondary serving cell corresponding to the uplink subframe is not a null set, the set of downlink subframes ($K_p$) of the primary serving cell corresponding to the uplink subframe is also not a null set, and an intersection set between $K_s$ and $K_p$ is not a null set, if downlink subframes with downlink DAI=1 and DAI=2 in the feedback window of the secondary serving cell are not included in the downlink subframes corresponding to the intersection set between $K_s$ and $K_p$, transmitting the HARQ-ACK information corresponding to the PDSCH of the serving cell by using a mode of PUCCH format 1b with channel selection when the TDD system configures multiple serving cells, wherein, the mapping table used during PUCCH format 1b with channel selection is determined according to one with a larger size in the sets of $K_s$ and $K_p$, the HARQ-ACK information without corresponding downlink subframes in the mapping table is set as a DTX state, and the two PUCCH resources ($n_{PUCCH,2}^{(1)}$, $n_{PUCCH,3}^{(1)}$) corresponding to the secondary serving cell are determined by using a mode of higher layer configuration with dynamic indication signaling;

if one downlink subframe with downlink DAI=1 or DAI=2 in the feedback window of the secondary serving cell is included in the downlink subframes corresponding to the intersection set between $K_s$ and $K_p$, transmitting the HARQ-ACK information corresponding to the PDSCH of the serving cell by using a mode of PUCCH format 1b with channel selection when the TDD system configures multiple serving cells, wherein, the mapping table used during PUCCH format 1b with channel selection is determined according to one with a larger size in the sets of $K_s$ and $K_p$, the HARQ-ACK information without corresponding downlink subframes in the mapping table is set as a DTX state, and when the secondary serving cell uses cross carrier scheduling, one PUCCH resource $n_{PUCCH,2}^{(1)}$ or $n_{PUCCH,3}^{(1)}$ corresponding to the secondary serving cell is determined according to an implicit mapping relationship with a Control Channel Element (CCE) of the Physical Downlink Control Channel (PDCCH) with DAI=1 or DAI=2, and the other PUCCH resource $n_{PUCCH,3}^{(1)}$ or $n_{PUCCH,2}^{(1)}$ is determined by using a mode of higher layer configuration with PDCCH dynamic indication; when the secondary serving cell does not use the cross-carrier scheduling, two PUCCH resources ($n_{PUCCH,2}^{(1)}$, $n_{PUCCH,3}^{(1)}$) corresponding to the secondary serving cell are determined by using a mode of higher layer configuration with PDCCH dynamic indication; or no matter whether the secondary serving cell uses the cross-carrier scheduling, both two PUCCH resources ($n_{PUCCH,2}^{(1)}$, $n_{PUCCH,3}^{(1)}$) corresponding to the secondary serving cell are determined by using a mode of higher layer configuration with dynamic indication signaling; and if downlink subframes with downlink DAI=1 and DAI=2 in the feedback window of the secondary serving cell are included in the downlink subframes corresponding to the intersection set between $K_s$ and $K_p$, transmitting the HARQ-ACK information corresponding to the PDSCH of the serving cell by using a mode of PUCCH format 1b with channel selection when the TDD system configures multiple serving cells, wherein, the mapping table used during PUCCH format 1b with channel selection is determined according to one with a larger size in the sets of $K_s$ and $K_p$, the HARQ-ACK information without corresponding downlink subframes in the mapping table is set as a DTX state, and when the secondary serving cell uses cross-carrier scheduling, two PUCCH resources ($n_{PUCCH,2}^{(1)}$, $n_{PUCCH,3}^{(1)}$) corresponding to the secondary serving cell are determined according to an implicit mapping relationship with indexes of Control Channel Elements (CCEs) of the PDCCH with DAI=1 and DAI=2 respectively; and when the secondary serving cell does not use the cross-carrier scheduling, two PUCCH resources ($n_{PUCCH,2}^{(1)}$, $n_{PUCCH,3}^{(1)}$) corresponding to the secondary serving cell are determined by using a mode of higher layer configuration with PDCCH dynamic indication; or no matter whether the secondary serving cell uses the cross-carrier scheduling, both two PUCCH resources ($n_{PUCCH,2}^{(1)}$, $n_{PUCCH,3}^{(1)}$) corresponding to the secondary serving cell are determined by using a mode of higher layer configuration with dynamic indication signaling.

Preferably, determining, according to the relationship between the set of downlink subframes of the aggregated serving cells in a feedback window corresponding to uplink subframe, the transmission mode of the HARQ-ACK information of the serving cells and the used PUCCH resources when transmitting the HARQ-ACK information specifically comprises:

when the set of downlink subframes ($K_s$) of the secondary serving cell corresponding to the uplink subframe is one subset of the set of downlink subframes ($K_p$) of the primary serving cell corresponding to the uplink subframe, or $K_s$ is equal to $K_p$, when the secondary serving cell uses cross-carrier scheduling, determining the PUCCH resources corresponding to the secondary serving cell according to an implicit mapping relationship between the PUCCH resources and the indexes of the CCEs of the PDCCH; and when the secondary serving cell does not use the cross-carrier scheduling, determining the PUCCH resources corresponding to the secondary serving cell by using a mode of higher layer configuration with dynamic indication signaling; or no matter whether the secondary serving cell uses the cross-carrier scheduling, determining the PUCCH resources corresponding to the secondary serving cell by using a mode of higher layer configuration with dynamic indication signaling.

The embodiments of the patent document further provide an apparatus for transmitting HARQ-ACK information, comprising:

a transmission mode and resource determination module, configured to determine, according to a relationship between sets of downlink subframes of aggregated serving cells in a feedback window corresponding to an uplink subframe, a transmission mode of the HARQ-ACK information and used PUCCH resources when transmitting the HARQ-ACK information; and an acknowledgement information transmission module, configured to transmit the HARQ-ACK information corresponding to Physical Downlink Shared Channel (PDSCH) or SPS release PDCCH on the determined PUCCH resources by using the determined transmission mode of the HARQ-ACK information.

Preferably, the apparatus further comprises a timing relationship determination module, configured to determine the timing relationship between the PDSCH and the HARQ-ACK information of the secondary serving cell by the following mode:

when the set of downlink subframes under the uplink-downlink configuration of the secondary serving cell is a subset of a set of downlink subframes under the uplink-downlink configuration of a primary serving cell, the timing relationship between the PDSCH and the HARQ-ACK information of the secondary serving cell complying with a timing relationship between a PDSCH and HARQ-ACK information corresponding to the primary serving cell; and when the set of downlink subframes under the uplink-downlink configuration of the secondary serving cell is not a subset of the set of downlink subframes under the uplink-downlink configuration of the primary serving cell, the timing relationship between the PDSCH and the HARQ-ACK information of the secondary serving cell complying with the timing relationship between the PDSCH and the HARQ-ACK information corresponding to the primary serving cell or complying with a timing relationship between the PDSCH and the HARQ-ACK information corresponding to the secondary serving cell, or complying with a timing relationship between a PDSCH and a HARQ corresponding to a reference uplink-downlink configuration X; wherein, the reference uplink-downlink configuration X is an uplink-downlink configuration with a minimum set of downlink subframes in the uplink-downlink configurations satisfying the following conditions: the set of uplink subframes under the uplink-downlink configuration is not only a subset of the set of uplink subframes under the uplink-downlink configuration of the primary serving cell, but also a subset of the set of uplink subframes under the uplink-downlink configuration of the secondary serving cell.

Preferably, the transmission mode and resource determination module is configured to determine, according to the timing relationship between the PDSCH and the HARQ-ACK information of the secondary serving cell determined by the timing relationship determination module, the set of downlink subframes of the aggregated serving cells in the feedback window corresponding to the uplink subframe.

Preferably, the transmission mode and resource determination module is configured to: when the set of downlink subframes of the secondary serving cell corresponding to the uplink subframe is not a null set and the set of downlink subframes of the primary serving cell corresponding to the uplink subframe is a null set, transmit the HARQ-ACK information corresponding to the PDSCH of the secondary serving cell by using a mode of PUCCH format 1a or PUCCH format 1b, wherein PUCCH resources needed to transmit the HARQ-ACK information are determined by using a mode of higher layer configuration with dynamic indication signaling, or the PUCCH resources needed to transmit the HARQ-ACK information are determined only by using a mode of higher layer configuration; or transmit the HARQ-ACK information corresponding to the PDSCH of the serving cells by using a mode of PUCCH format 1b with channel selection when the TDD system configures multiple serving cells, wherein a mapping table used during the PUCCH format 1b with channel selection is determined according to the size of a set of downlink subframes ($K_s$) of the secondary serving cell corresponding to the uplink subframe, the HARQ-ACK information of the primary serving cell in the mapping table is set as a Discontinuous Transmission (DTX) state, and the PUCCH resources corresponding to the secondary serving cell are determined by using a mode of higher layer configuration with dynamic indication signaling; or transmit the HARQ-ACK information corresponding to the PDSCH of the secondary serving cell by using a mode of PUCCH format 1b with channel selection when the TDD system configures a single serving cell, wherein a mapping table used during the PUCCH format 1b with channel selection is determined according to the size of the set of downlink subframes ($K_s$) of the secondary serving cell corresponding to the uplink subframe, and the PUCCH resources corresponding to the downlink subframes corresponding to uplink subframe of the secondary serving cell are determined by using a mode of higher layer configuration with dynamic indication signaling.

Preferably, the transmission mode and resource determination module is configured to determine the transmission mode of the HARQ-ACK information according to the size of the set of downlink subframes ($K_s$) of the secondary serving cell corresponding to the uplink subframe by the following mode:

when the number of elements comprised in $K_s$ is 1 or 2, transmitting the HARQ-ACK information corresponding to the PDSCH of the secondary serving cell by using a mode of PUCCH format 1a or PUCCH format 1b; and when the number of elements comprised in $K_s$ is more than 2, transmitting the HARQ-ACK information corresponding to the PDSCH of the serving cell by using a mode of PUCCH format 1b with channel selection when the TDD system configures multiple serving cells or a single serving cell; or when the number of elements comprised in $K_s$ is 1, transmitting the HARQ-ACK information corresponding to the PDSCH of the secondary serving cell by using a mode of PUCCH format 1a or PUCCH format 1b; and when the number of elements comprised in $K_s$ is more than 1, transmitting the HARQ-ACK information corresponding to the PDSCH of the secondary serving cell, by using a mode of PUCCH format 1b with channel selection when the TDD system configures multiple serving cells or a single serving cell.

Preferably, the transmission mode and resource determination module is configured to: if it is determined that the HARQ-ACK information corresponding to the PDSCH of the secondary serving cell is transmitted by using a mode of PUCCH format 1a or PUCCH format 1b, when $K_s$ only comprises one element, i.e., the uplink subframes need to feed back HARQ-ACK information corresponding to the PDSCH of one downlink subframe of the secondary serving cell, if the secondary serving cell is configured to only comprise a transmission mode of one transport block, transmit the HARQ-ACK information corresponding to the PDSCH of the secondary serving cell by using a mode of PUCCH format 1a, and if the secondary serving cell is configured to at most support a transmission mode of two transport blocks, transmit the HARQ-ACK information corresponding to the PDSCH of the secondary serving cell by using a mode of PUCCH format 1b;

when $K_s$ comprises two elements, i.e., the uplink subframes need to feed back the HARQ-ACK information of two downlink subframes of the secondary serving cell, obtain 2-bit HARQ-ACK information corresponding to the two downlink subframes after performing spatial bundling on the HARQ-ACK information of the two downlink subframes, and transmit the 2-bit HARQ-ACK information by using a mode of PUCCH format 1b; and when $K_s$ comprises more than two elements, i.e., the uplink subframes need to feed back HARQ-ACK information of more than two downlink subframes of the secondary serving cell, obtain 2-bit HARQ-ACK information after performing spatial bundling and then time-domain bundling operation on the HARQ-ACK information of the multiple downlink subframes, and then transmit the 2-bit HARQ-ACK information by using a mode of PUCCH format 1b.

Preferably, the transmission mode and resource determination module is configured to: if it is determined that the HARQ-ACK information corresponding to the PDSCH of the serving cell is transmitted, by using a mode of PUCCH format 1b with channel selection when the TDD system configures multiple serving cells, when $K_s$ only comprises one element, i.e., the uplink subframes need to feed back HARQ-ACK information of one downlink subframe of the secondary serving cell, if the secondary serving cell is configured to only comprise a transmission mode of one transport block, use a channel selection mapping table of A=2 during the carrier aggregation of the TDD system, set the HARQ-ACK information corresponding to the primary serving cell as DTX, and obtain one PUCCH resource corresponding to the second serving cell by using a mode of higher layer configuration with dynamic indication signaling; and if the secondary serving cell is configured to support a transmission mode of two transport blocks, use a channel selection mapping table of A=3 during the carrier aggregation of the TDD system, set the HARQ-ACK information corresponding to the primary serving cell as DTX, and determine two PUCCH resources corresponding to the second serving cell by using a mode of higher layer configuration with dynamic indication signaling;

when $K_s$ comprises two elements, i.e., the uplink subframes need to feed back HARQ-ACK information of two downlink subframes of the secondary serving cell, obtain 2-bit HARQ-ACK information corresponding to the two downlink subframes after performing spatial bundling on the HARQ-ACK information of the two downlink subframes, use a channel selection mapping table of A=4 during the carrier aggregation of the TDD system, set the HARQ-ACK information corresponding to the primary serving cell as DTX, and determine two PUCCH resources corresponding to the second serving cell by using a mode of higher layer configuration with dynamic indication signaling;

when $K_s$ comprises more than two elements, i.e., the uplink subframes need to feed back HARQ-ACK information of more than two downlink subframes of the secondary serving cell, obtain 2-bit HARQ-ACK information after performing spatial bundling and then time-domain bundling operation on the HARQ-ACK information of the multiple downlink subframes, and then transmit the 2-bit HARQ-ACK information by using the PUCCH format 1b, use a channel selection mapping table of M=3 or M=4 (M is the size of $K_s$) during the carrier aggregation of the TDD system, set the HARQ-ACK information corresponding to the primary serving cell as DTX, and determine two PUCCH resources corresponding to the second serving cell by using a mode of higher layer configuration with dynamic indication signaling.

Preferably, the transmission mode and resource determination module is configured to: if it is determined that the HARQ-ACK information corresponding to the PDSCH of the secondary serving cell is transmitted, by using a mode of PUCCH format 1b with channel selection when the TDD system configures a single serving cell, when $K_s$ only comprises one element, i.e., the uplink subframes need to feed back HARQ-ACK information of one downlink subframe of the secondary serving cell, if the secondary serving cell is configured to only comprise a transmission mode of one transport block, transmit the HARQ-ACK information corresponding to the PDSCH of the secondary serving cell by using a mode of PUCCH format 1a, and if the secondary serving cell is configured to at most support a transmission mode of two transport blocks, transmit the HARQ-ACK information corresponding to the PDSCH of the secondary serving cell by using a mode of PUCCH format 1b; and determine the corresponding PUCCH resources by using a mode of higher layer configuration with dynamic indication signaling when transmitting the HARQ-ACK information; and when $K_s$ comprises more than one element, i.e., the uplink subframes need to feed back HARQ-ACK information of more than one downlink subframe of the secondary serving cell, obtain M-bit (M is the size of $K_s$) HARQ-ACK information corresponding to the downlink subframes after performing spatial bundling on the HARQ-ACK information of the downlink subframes, use a channel selection mapping table of M=2, M=3 or M=4 during a single service of the TDD system, and determine PUCCH resources corresponding to the downlink subframes corresponding to the uplink subframe of the second serving cell by using a mode of higher layer configuration with dynamic indication signaling.

Preferably, the transmission mode and resource determination module is configured to: when the set of downlink subframes ($K_s$) of the secondary serving cell corresponding to the uplink subframe is not a null set, the set of downlink subframes ($K_p$) of the primary serving cell corresponding to the uplink subframe is also not a null set, and an intersection set between $K_s$ and $K_p$ is a null set, transmit the HARQ-ACK information, by using a mode of PUCCH format 1b with channel selection when the TDD system configures multiple serving cells, wherein the mapping table used during the PUCCH format 1b with channel selection is determined according to one with a larger size in sets of $K_s$ and $K_p$, the HARQ-ACK information without corresponding downlink subframes in the mapping table is set as a DTX state, and the PUCCH resources corresponding to the secondary serving cell are determined by using a mode of higher layer configuration with dynamic indication signaling.

Preferably, the transmission mode and resource determination module is configured to:

when the set of downlink subframes ($K_s$) of the secondary serving cell corresponding to the uplink subframe is not a null set, the set of downlink subframes ($K_p$) of the primary serving cell corresponding to the uplink subframe is also not a null set, and an intersection set between $K_s$ and $K_p$ is not a null set, if downlink subframes with downlink DAI=1 and DAI=2 in the feedback window of the secondary serving cell are not included in the downlink subframes corresponding to the intersection set between $K_s$ and $K_p$, transmit the HARQ-ACK information corresponding to the PDSCH of the serving cell, by using a mode of PUCCH format 1b with channel selection when the TDD system configures multiple serving cells, wherein, the mapping table used during PUCCH format 1b with channel selection is determined according to one with a larger size in the sets of $K_s$ and $K_p$, the HARQ-ACK information without corresponding downlink subframes in the mapping table is set as a DTX state, and the two PUCCH resources ($n_{PUCCH,2}^{(1)}$, $n_{PUCCH,3}^{(1)}$) corresponding to the secondary serving cell are determined by using a mode of higher layer configuration with dynamic indication signaling;

if one downlink subframe with downlink DAI=1 or DAI=2 in the feedback window of the secondary serving cell is included in the downlink subframes corresponding to the intersection set between $K_s$ and $K_p$, transmit the HARQ-ACK information corresponding to the PDSCH of the serving cell, by using a mode of PUCCH format 1b with channel selection when the TDD system configures multiple serving cells, wherein, the mapping table used during PUCCH format 1b with channel selection is determined according to one with a larger size in the sets of $K_s$ and $K_p$, the HARQ-ACK information without corresponding downlink subframes in the mapping table is set as a DTX state, and when the secondary serving cell uses cross-carrier scheduling, one PUCCH resource $n_{PUCCH,2}^{(1)}$ or $n_{PUCCH,3}^{(1)}$ corresponding to the secondary serving cell is determined according to an implicit mapping relationship with a Control Channel Element (CCE) of the Physical Downlink Control Channel (PDCCH) with DAI=1 or DAI=2, and the other PUCCH resource $n_{PUCCH,3}^{(1)}$ or $n_{PUCCH,2}^{(1)}$ is determined by using a mode of higher layer configuration with PDCCH dynamic indication; when the secondary serving cell does not use the cross-carrier scheduling, two PUCCH resources ($n_{PUCCH,2}^{(1)}$, $n_{PUCCH,3}^{(1)}$) corresponding to the secondary serving cell are determined by using a mode of higher layer configuration with PDCCH dynamic indication; or no matter whether the secondary serving cell uses the cross-carrier scheduling, both two PUCCH resources ($n_{PUCCH,2}^{(1)}$, $n_{PUCCH,3}^{(1)}$) corresponding to the secondary serving cell are determined by using a mode of higher layer configuration with dynamic indication signaling; and if downlink subframes with downlink DAI=1 and DAI=2 in the feedback window of the secondary serving cell are included in the downlink subframes corresponding to the intersection set between $K_s$ and $K_p$, transmit the HARQ-ACK information corresponding to the PDSCH of the serving cell, by using a mode of PUCCH format 1b with channel selection when the TDD system configures multiple serving cells, wherein, the mapping table used during PUCCH format 1b with channel selection is determined according to one with a larger size in the sets of $K_s$ and $K_p$, the HARQ-ACK information without corresponding downlink subframes in the mapping table is set as a DTX state, and when the secondary serving cell uses cross-carrier scheduling, two PUCCH resources ($n_{PUCCH,2}^{(1)}$, $n_{PUCCH,3}^{(1)}$) corresponding to the secondary serving cell are determined according to an implicit mapping relationship with indexes of Control Channel Elements (CCEs) of the PDCCH with DAI=1 and DAI=2 respectively; and when the secondary serving cell does not use the cross-carrier scheduling, two PUCCH resources ($n_{PUCCH,2}^{(1)}$, $n_{PUCCH,3}^{(1)}$) corresponding to the secondary serving cell are determined by using a mode of higher layer configuration with PDCCH dynamic indication; or no matter whether the secondary serving cell uses the cross-carrier scheduling, both two PUCCH resources ($n_{PUCCH,2}^{(1)}$, $n_{PUCCH,3}^{(1)}$) corresponding to the secondary serving cell are determined by using a mode of higher layer configuration with dynamic indication signaling.

Preferably, the transmission mode and resource determination module is configured to: when the set of downlink subframes ($K_s$) of the secondary serving cell corresponding to the uplink subframe is one subset of the set of downlink subframes ($K_p$) of the primary serving cell corresponding to the uplink subframe, or $K_s$ is equal to $K_p$, when the secondary serving cell uses cross-carrier scheduling, determine the PUCCH resources corresponding to the secondary serving cell according to an implicit mapping relationship between the PUCCH resources and the indexes of the CCEs of the PDCCH; and when the secondary serving cell does not use the cross-carrier scheduling, determine the PUCCH resources corresponding to the secondary serving cell by using a mode of higher layer configuration with dynamic indication signaling; or no matter whether the secondary serving cell uses the cross-carrier scheduling, determine the PUCCH resources corresponding to the secondary serving cell by using a mode of higher layer configuration with dynamic indication signaling.

BRIEF DESCRIPTION OF DRAWINGS

The accompanying drawings described herein are used to provide a further understanding of the patent document and constitute a part of this application, and the schematic embodiments of the patent document and the descriptions thereof are used to explain the patent document and do not constitute an improper definition of the patent document. In the accompanying drawings.

PREFERRED EMBODIMENTS OF THE PATENT DOCUMENT

As described above, the determination of PUCCH resources and the determination of the mapping table are closely related to each other, while the determination of the mapping table and the timing relationship between the PDSCH and the HARQ-ACK of the secondary serving cell are also closely related to each other.

In addition, as the PUCCH format 1b with channel selection can only support aggregation of 2 serving cells, in the subsequent discussion, it only relates to aggregation of 2 serving cells, that is, there is only a primary serving cell (PCell) and a secondary serving cell (SCell).

Figure 1:
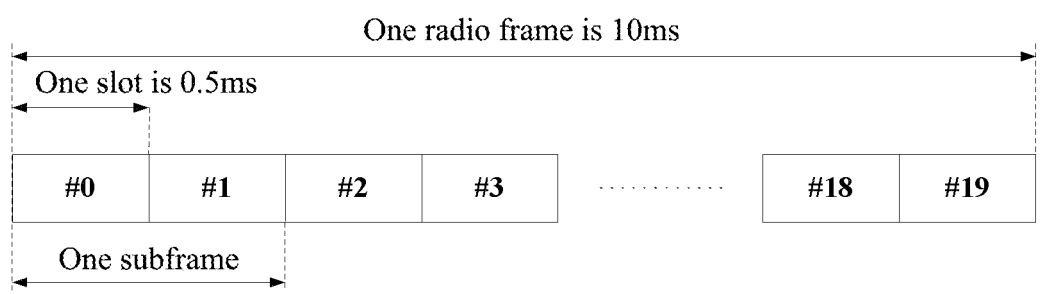
FIG. 1 is a diagram of a frame structure in the LTE/LTE-A FDD system according to the related technology.
Figure 2:
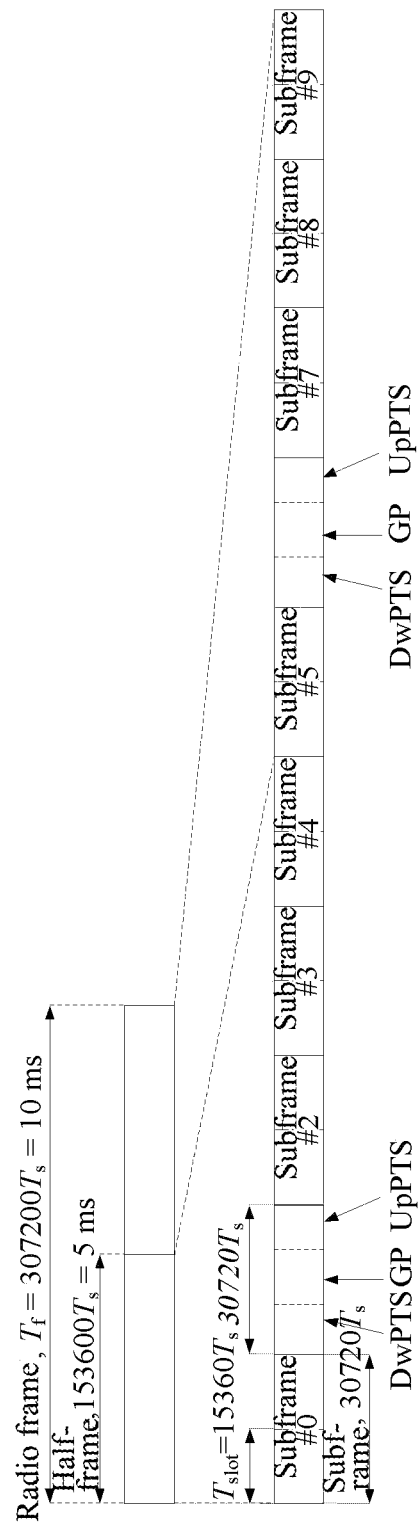
FIG. 2 is a diagram of a frame structure in the LTE/LTE-A TDD system according to the related technology.
Figures 3, 4:
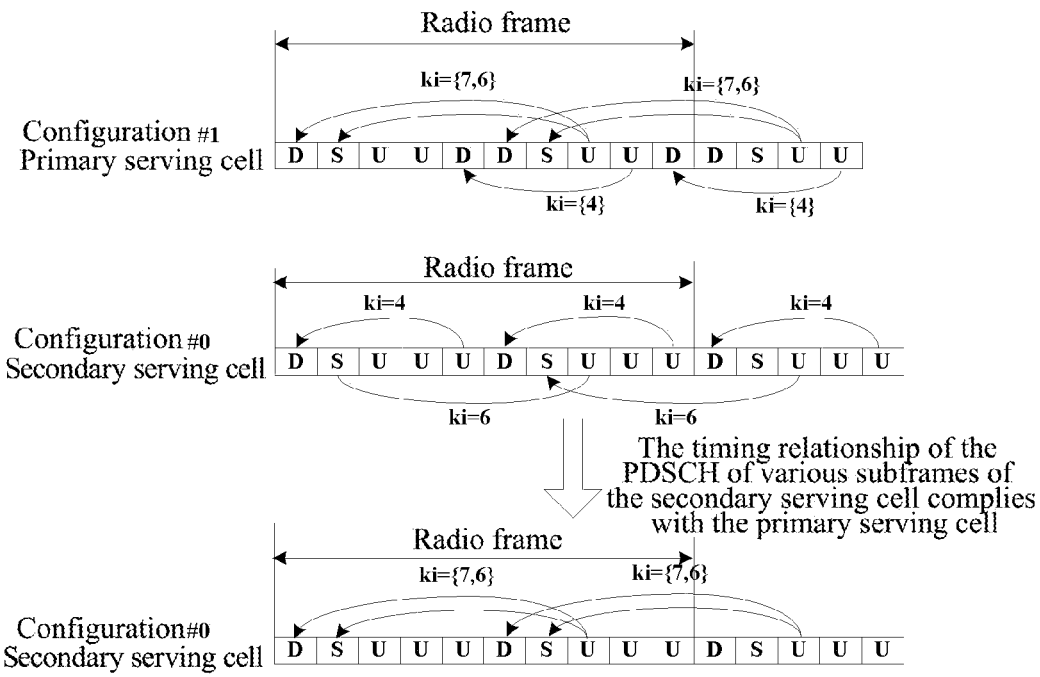
FIG. 3 is a diagram of a timing relationship between the PDSCH and the HARQ-ACK of a secondary serving cell.
FIG. 4 is a diagram of classification during carrier aggregation of different uplink-downlink configurations.

Considering that the timing relationship between the PDSCH and the corresponding HARQ-ACK of various downlink subframes of the secondary serving cell is related to the uplink-downlink configuration of the primary and secondary serving cells participating in the aggregation, therefore, there are the following three categories of scenarios according to the relationship between the sets of downlink subframes of the serving cells participating in the aggregation, which are shown specifically in FIG. 4:

first category: the set of downlink subframes under the uplink-downlink configuration of the secondary serving cell is a subset of the set of downlink subframes under the uplink-downlink configuration of the primary serving cell; i.e., all downlink subframes of the secondary serving cell can be found in the set of downlink subframes of the primary serving cell;

second category: the set of downlink subframes under the uplink-downlink configuration of the secondary serving cell is a superset of the set of downlink subframes under the uplink-downlink configuration of the primary serving cell; i.e., all downlink subframes of the primary serving cell can be found in the set of downlink subframes of the secondary serving cell;

third category: the set of downlink subframes under the uplink-downlink configuration of the secondary serving cell is neither a subset of the set of downlink subframes under the uplink-downlink configuration of the primary serving cell, nor a superset of the set of downlink subframes of the primary serving cell.

The processing modes of the above three categories of scenarios will be described in detail below.

For the aggregation in the first category of scenarios, the processing mode thereof is that the timing relationship between the PDSCH and the HARQ-ACK information of the secondary serving cell uses the same timing relationship as that of the primary serving cell. Then, when the HARQ-ACK is fed back on a certain uplink subframe, downlink subframes of the secondary serving cell corresponding to the uplink subframe are necessarily a subset of the downlink subframes of the primary serving cell. At this time, when the secondary serving cell uses cross-carrier scheduling, the PUCCH resources corresponding to the secondary serving cell are determined according to an implicit mapping relationship with the indexes of the CCEs of the PDCCH, while when the secondary serving cell does not use the cross-carrier scheduling, the PUCCH resources corresponding to the secondary serving cell are determined by using a mode of higher layer configuration with dynamic indication signaling. Considering that it needs to correspondingly enhance the PDCCH in the subsequent releases, the downlink control information is not limited to be transmitted in the traditional PDCCH region. At this time, no matter whether the secondary serving cell uses the cross-carrier scheduling, the PUCCH resources corresponding to the secondary serving cell can be determined by using a mode of higher layer configuration with dynamic indication signaling.

For the aggregation in the second category of scenario and the third category of scenario, there are the following several candidate schemes for the timing relationship between the PDSCH and the HARQ-ACK information of the secondary serving cell:

candidate scheme 1: use the timing relationship of the primary serving cell;

candidate scheme 2: use the timing relationship of the secondary serving cell itself;

candidate scheme 3: use the timing relationship of reference uplink-downlink configuration X;

It should be noted that, in a broad sense, the above candidate schemes 1 and 2 can actually be considered as a particular example of the candidate scheme 3. That is, in the candidate scheme 1, the reference uplink-downlink configuration is fixedly the primary serving cell, and in the candidate scheme 2, the reference uplink-downlink configuration is the secondary serving cell. Therefore, in order to distinguish the candidate scheme 3 from the candidate schemes 1 and 2, the reference uplink-downlink configuration in the candidate scheme 3 hereinafter is defined as an uplink-downlink configuration different from the aggregated serving cells.

Figure 12:
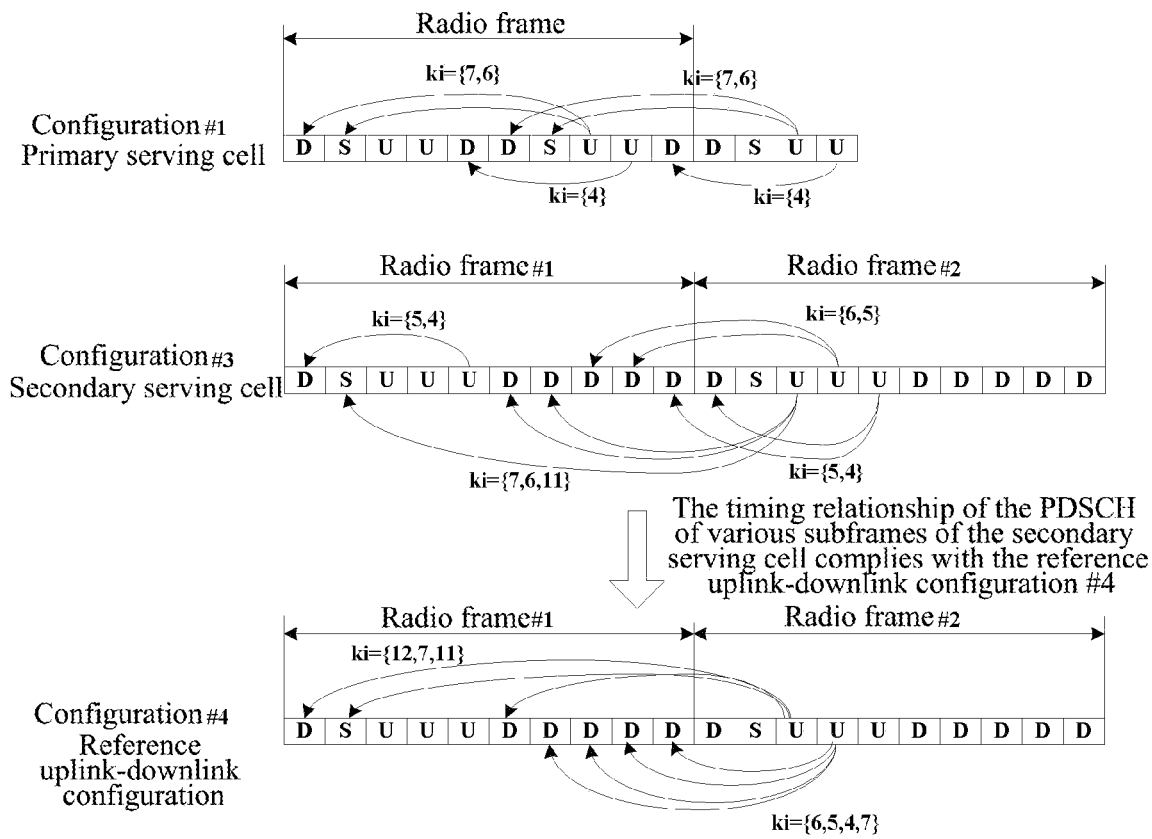
FIG. 12 is a diagram of a timing relationship between the PDSCH and the HARQ-ACK of primary and secondary serving cells during aggregation of configuration #1 and configuration #3.

In the candidate scheme 3, the reference uplink-downlink configuration X is an uplink-downlink configuration with a minimum set of downlink subframes in the uplink-downlink configurations satisfying the following conditions: the set of uplink subframes under the uplink-downlink configuration is not only a subset of the set of uplink subframes under the uplink-downlink configuration of the primary serving cell, but also a subset of the set of uplink subframes under the uplink-downlink configuration of the secondary serving cell. Such reference uplink-downlink configuration can ensure that the HARQ-ACK feedback of the PDSCH of the downlink subframes of the secondary serving cell can be fed back on the uplink subframe of the primary serving cell. As shown in FIG. 12, for the aggregation of configurations #1 and #3, the uplink-downlink configurations satisfying the condition "the set of uplink subframes under the uplink-downlink configuration is not only a subset of the set of uplink subframes under the uplink-downlink configuration of the primary serving cell, but also a subset of the set of uplink subframes under the uplink-downlink configuration of the secondary serving cell" comprise configurations #4 and #5, wherein, the set of downlink subframes of configuration #4 is smaller than that of configuration #5, and therefore, the reference uplink-downlink configuration is selected as configuration #4. Thus, according to the timing relationship of configuration #4, the HARQ-ACK of the downlink subframe #0/1/5 of the secondary serving cell is transmitted on subframe #2 of the next radio frame, and the HARQ-ACK of the downlink subframe #6/7/8/9 of the secondary serving cell is transmitted on subframe #3 of the next radio frame. Both subframes #2 and #3 are uplink subframes on the primary serving cell, and therefore, it can ensure that there are corresponding uplink subframes transmitted on the primary serving cell for the HARQ-ACK of various downlink subframes of the secondary serving cell.

For the aggregation in the second category of scenario, when candidate scheme 1 is used, as the timing relationship between the PDSCH and the HARQ-ACK of the secondary serving cell is the same as that of the primary serving cell, when the HARQ-ACK is fed back on a certain uplink subframe, the set of downlink subframes of the secondary serving cell corresponding to the uplink subframe is necessarily the same as the set of downlink subframes of the primary serving cell. At this time, when the secondary serving cell uses cross-carrier scheduling, the PUCCH resources corresponding to the secondary serving cell can be determined according to an implicit mapping relationship with the indexes of the CCEs of the PDCCH, while when the secondary serving cell does not use the cross-carrier scheduling, the PUCCH resources corresponding to the secondary serving cell can be determined by using a mode of higher layer configuration with dynamic indication signaling. Considering that it needs to correspondingly enhance the PDCCH in the subsequent releases, the downlink control information is not limited to be transmitted in the traditional PDCCH region. At this time, no matter whether the secondary serving cell uses the cross-carrier scheduling, the PUCCH resources corresponding to the secondary serving cell can be determined by using a mode of higher layer configuration with dynamic indication signaling.

For the aggregation in the second category of scenario, when the candidate scheme 2 is used, as the timing relationship between the PDSCH and the HARQ-ACK of the secondary serving cell uses the timing relationship of the secondary serving cell itself, when the HARQ-ACK is fed back on a certain uplink subframe, there may be the following several cases for the relationship between the set of the downlink subframes (denoted as $K_s$) of the secondary serving cell corresponding to the uplink subframe and the set of the downlink subframes (denoted as $K_p$) of the primary serving cell corresponding to the uplink subframe:

case 1: $K_s \neq \varnothing$, $K_p = \varnothing$;
case 2: $K_s \cap K_p = \varnothing$ (except for case 1), i.e., $K_s \neq \varnothing$, $K_p \neq \varnothing$ and $K_s \cap K_p = \varnothing$;
case 3: $K_s \cap K_p \neq \varnothing$.

For the above case 1, it is equivalent to that on the uplink subframe, there is no need to feed back the HARQ-ACK information corresponding to the PDSCH of the primary serving cell, and it only needs to feed back the HARQ-ACK information corresponding to the PDSCH of the secondary serving cell. For case 1, there may be the following processing modes:

processing mode 1-1: the HARQ-ACK information corresponding to the PDSCH of the secondary serving cell is fed back by using PUCCH format 1a/1b, wherein, the PUCCH resources needed to feed back the HARQ-ACK are determined by using a mode of higher layer configuration with PDCCH dynamic indication, and when $K_s$ only comprises one element, it means that when it only needs to feed back the HARQ-ACK information of one downlink subframe of the secondary serving cell, the HARQ-ACK information is transmitted by using format 1a(corresponding to a secondary serving cell being configured to only include a transmission mode of one transmission block) or format 1b (corresponding to a secondary serving cell being configured to at most support a transmission mode of two transmission blocks); when $K_s$ includes two elements, it means that it needs to feed back the HARQ-ACK information of two downlink subframes of the secondary serving cell on the uplink subframe, the spatial bundling (i.e., spatial logic AND operation) is performed on HARQ-ACK information of the two downlink subframes, to obtain 2-bit HARQ-ACK information corresponding to the two downlink subframes, and the 2-bit HARQ-ACK information is transmitted by using format 1b; and when $K_s$ comprises more than two elements, i.e., it needs to feed back HARQ-ACK information of more than two downlink subframes of the secondary serving cell on the uplink subframe, 2-bit information is obtained after performing spatial bundling and then time-domain bundling operation on the HARQ-ACK information of the multiple downlink subframes, and then the 2-bit information is transmitted by using a mode of PUCCH format 1b.

processing mode 1-2: the HARQ-ACK information is fed back by using a mode of PUCCH format 1b with channel selection when the TDD system configures multiple serving cells, wherein the mapping table used during the PUCCH format 1b with channel selection is determined according to the size of $K_s$, the HARQ-ACK information of the primary serving cell in the mapping table is set as a DTX state, and the PUCCH resources corresponding to the secondary serving cell are obtained by using a mode of higher layer configuration with PDCCH dynamic indication.

processing mode 1-3: the corresponding HARQ-ACK information is fed back by using a mode of PUCCH format 1b with channel selection when the TDD system configures a single serving cell, wherein a mapping table used during the PUCCH format 1b with channel selection is determined according to the size of the set of downlink subframes ($K_s$) of the secondary serving cell corresponding to the uplink subframe, and the PUCCH resources corresponding to the downlink subframes corresponding to uplink subframe of the secondary serving cell are determined by using a mode of higher layer configuration with dynamic indication;

processing mode 1-4: one of the above transmission modes is determined to be used according to the size of $K_s$, which specifically comprises the following steps:

when the number of elements comprised in $K_s$ is 1 or 2, transmitting the HARQ-ACK information corresponding to the PDSCH of the secondary serving cell by using a mode of PUCCH format 1a or PUCCH format 1b; and when the number of elements comprised in $K_s$ is more than 2, transmitting the HARQ-ACK information corresponding to the PDSCH of the secondary serving cell by using a mode of PUCCH format 1*b* with channel selection when the TDD system configures multiple serving cells or a single serving cell; or when the number of elements comprised in $K_s$ is 1, transmitting the HARQ-ACK information corresponding to the PDSCH of the secondary serving cell by using a mode of PUCCH format 1*a* or PUCCH format 1*b*; and when the number of elements comprised in $K_s$ is more than 1, transmitting the HARQ-ACK information corresponding to the PDSCH of the secondary serving cell by using a mode of PUCCH format 1*b* with channel selection when the TDD system configures multiple serving cells or a single serving cell.

For case 2, the corresponding HARQ-ACK information is fed back, by using a mode of PUCCH format 1*b* with channel selection when the TDD system configures multiple serving cells, wherein the mapping table used during the PUCCH format 1*b* with channel selection is determined according to one with a larger size in sets of $K_s$ and $K_p$, the HARQ-ACK information without corresponding downlink subframes in the mapping table is set as a DTX state, and the two PUCCH resources corresponding to the secondary serving cell are obtained by using a mode of higher layer configuration with dynamic indication signaling.

For case 3, it can be further divided into the following cases:

case 3-1: when the downlink subframes with downlink DAI=1 and DAI=2 in the bundling window of the secondary serving cell are not included in the downlink subframes commonly included in $K_s$ and $K_p$;

case 3-2: when a downlink subframe with downlink DAI=1 or DAI=2 in the bundling window of the secondary serving cell is included in the downlink subframes commonly included in $K_s$ and $K_p$;

case 3-3: when a downlink subframe with downlink DAI=1 and DAI=2 in the bundling window of the secondary serving cell is included in the downlink subframes commonly included in $K_s$ and $K_p$;

for the above cases 3-1, 3-2 and 3-3, the corresponding processing modes thereof are as follows respectively:

processing mode 3-1: when downlink subframes with downlink DAI=1 and DAI=2 in the bundling window of the secondary serving cell are not included in the downlink subframes commonly included in $K_s$ and $K_p$, the corresponding HARQ-ACK information is fed back by using a mode of PUCCH format 1*b* with channel selection when the TDD system configures multiple serving cells, wherein, the mapping table used during PUCCH format 1*b* with channel selection is determined according to one with a larger size in the sets of $K_s$ and $K_p$, the HARQ-ACK information without corresponding downlink subframes in the mapping table is set as a DTX state, and the PUCCH resources corresponding to the secondary serving cell are obtained by using a mode of higher layer configuration with PDCCH dynamic indication;

processing mode 3-2: when one downlink subframe with downlink DAI=1 or DAI=2 in the bundling window of the secondary serving cell is included in the downlink subframes corresponding to the intersection set between $K_s$ and $K_p$, the HARQ-ACK information corresponding to the PDSCH of the secondary serving cell is fed back, by using a mode of PUCCH format 1*b* with channel selection when the TDD system configures multiple serving cells, wherein, the mapping table used during PUCCH format 1*b* with channel selection is determined according to one with a larger size in the sets of $K_s$ and $K_p$, the HARQ-ACK information without corresponding downlink subframes in the mapping table is set as a DTX state, and when the secondary serving cell uses cross-carrier scheduling, one PUCCH resource $n_{PUCCH,2}^{(1)}$ or $n_{PUCCH,3}^{(1)}$ corresponding to the secondary serving cell is determined according to an implicit mapping relationship with a Control Channel Element (CCE) of the PDCCH with DAI=1 or DAI=2, and the other PUCCH resource $n_{PUCCH,3}^{(1)}$ or $n_{PUCCH,2}^{(1)}$ is determined by using a mode of higher layer configuration with PDCCH dynamic indication; when the secondary serving cell does not use the cross-carrier scheduling, two PUCCH resources $(n_{PUCCH,2}^{(1)}, n_{PUCCH,3}^{(1)})$ corresponding to the secondary serving cell are determined by using a mode of higher layer configuration with PDCCH dynamic indication; or no matter whether the secondary serving cell uses the cross-carrier scheduling, both two PUCCH resources $(n_{PUCCH,2}^{(1)}, n_{PUCCH,3}^{(1)})$ corresponding to the secondary serving cell are determined by using a mode of higher layer configuration with PDCCH dynamic indication; and processing mode 3-3: when downlink subframes with downlink DAI=1 and DAI=2 in the bundling window of the secondary serving cell are included in the downlink subframes corresponding to the intersection set between $K_s$ and $K_p$, the HARQ-ACK information corresponding to the PDSCH of the secondary serving cell is fed back, by using a mode of PUCCH format 1*b* with channel selection when the TDD system configures multiple serving cells, wherein, the mapping table used during PUCCH format 1*b* with channel selection is determined according to one with a larger size in the sets of $K_s$ and $K_p$, the HARQ-ACK information without corresponding downlink subframes in the mapping table is set as a DTX state, and two PUCCH resources $(n_{PUCCH,2}^{(1)}, n_{PUCCH,3}^{(1)})$ corresponding to the secondary serving cell are determined according to an implicit mapping relationship with indexes of CCEs of the PDCCH with DAI=1 and DAI=2 respectively; and when the secondary serving cell does not use the cross-carrier scheduling, two PUCCH resources $(n_{PUCCH,2}^{(1)}, n_{PUCCH,3}^{(1)})$ corresponding to the secondary serving cell are determined by using a mode of higher layer configuration with dynamic indication signaling; or no matter whether the secondary serving cell uses the cross-carrier scheduling, two PUCCH resources $(n_{PUCCH,2}^{(1)}, n_{PUCCH,3}^{(1)})$ corresponding to the secondary serving cell are determined by using a mode of higher layer configuration with PDCCH dynamic indication.

Preferably, for the aggregation in the second category of scenario, by analyzing all possible aggregation cases, if the timing relationship of the reference uplink-downlink subframe configuration in candidate scheme 3 is used, the reference uplink-downlink configuration thereof is the secondary serving cell itself, and therefore, in this case, it is equivalent to the aggregation in the second category of scenario by using candidate scheme 2.

For the aggregation in the third category of scenario, when candidate schemes 1 and 2 are used, the processing mode thereof is the same as the aggregation in the second category of scenario by using candidate schemes 1 and 2. The description thereof will be omitted here.

For the aggregation in the third category of scenario, when candidate scheme 3 is used, after the timing relationship between the PDSCH and the HARQ-ACK information of the secondary serving cell is determined, when related PUCCH resources are determined subsequently, the relationship between the set of downlink subframes of the secondary serving cell corresponding to a certain specified uplink subframe and the set of downlink subframes of the primary serving cell corresponding to the uplink subframe is totally the same as those of the three cases existing when the aggregation in the second category of scenario uses candidate scheme 2. Therefore, the processing mode can be known with reference to the above processing mode in which the aggregation in the second category of scenario uses candidate scheme 2, and the description will also be omitted here.

The embodiments of the patent document will be illustrated in detail hereinafter in conjunction with accompanying drawings. It should be illustrated that, in the case of no conflict, the embodiments of this application and the features in the embodiments could be combined randomly with each other.

Specific Embodiment 1

The present embodiment relates to that aggregation uses a candidate scheme one in a first category of scenario. As shown in FIG. 3, a serving cell using an uplink-downlink configuration #1 and a serving cell using an uplink-downlink configuration #0 are aggregated, and the serving cell using the uplink-downlink configuration #1 is configured as a primary serving cell and the serving cell using an uplink-downlink configuration #0 is a secondary serving cell.

The timing relationship between the PDSCH and the corresponding HARQ-ACK on various downlink subframes of the secondary serving cell will use the timing relationship between the PDSCH and the HARQ-ACK of the primary serving cell (that is, configuration 1).

According to the timing relationship illustrated in FIG. 3, the UE will feed back the HARQ-ACK information of the downlink subframes #0 and #1 of the primary serving cell and the HARQ-ACK information of the downlink subframes #0 and #1 of the secondary serving cell on the uplink subframe #7. According to the regulation of the existing protocol, when the downlink control information is transmitted in a traditional PDCCH region, PUCCH resources corresponding to the PDCCH of the downlink subframes #0 and #1 will be reserved in a dynamic PUCCH region on the uplink subframe #7. Therefore, in this case, when the secondary serving cell uses cross-carrier scheduling, the PUCCH resources of the secondary serving cell can be obtained by using a mode of an implicit mapping with the PDCCH. When the cross-carrier scheduling is used in the secondary serving cell, the PUCCH resources corresponding to the secondary serving cell can be determined by using a mode of higher layer configuration with dynamic indication signaling. Alternatively, no matter whether the secondary serving cell is configured to use cross-carrier scheduling, the PUCCH resources corresponding to the secondary serving cell can be determined by using a mode of higher layer configuration with dynamic indication signaling.

Specific Embodiment 2

Figure 5:
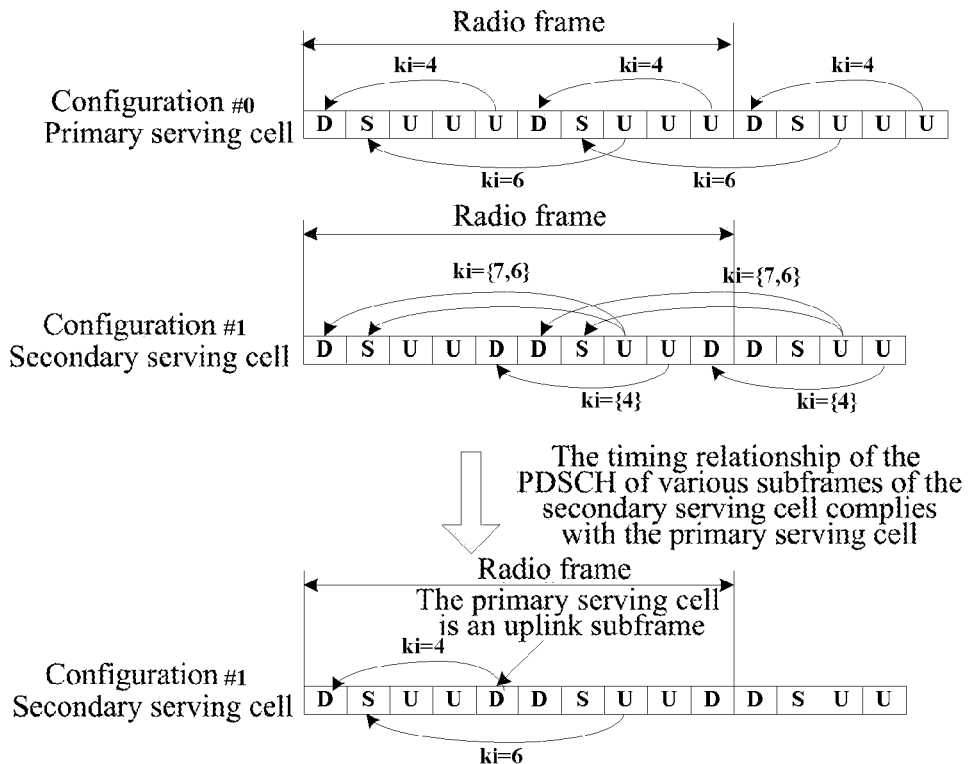
FIG. 5 is a diagram of a timing relationship between the PDSCH and the HARQ-ACK of primary and secondary serving cells during aggregation of configuration #0 and configuration #1.

The present embodiment relates to that aggregation uses a candidate scheme 1 in a second category of scenario. As shown in FIG. 5, a serving cell using an uplink-downlink configuration #0 and a serving cell using an uplink-downlink configuration #1 are aggregated, and the serving cell using the uplink-downlink configuration #0 is configured as a primary serving cell and the serving cell using an uplink-downlink configuration #1 is a secondary serving cell.

As the secondary serving cell uses the same timing relationship as that of the primary serving cell, in this case, when the cross-carrier scheduling is not supported, for the secondary cell, only downlink subframes #0 and #1 are scheduled actually, and the downlink subframe #4 can not be scheduled.

According to the timing relationship illustrated in FIG. 5, the UE will feed back the HARQ-ACK information of the downlink subframes #0 and #1 of the primary/secondary serving cell on the uplink subframes #4 and #7 respectively. According to the regulation of the existing protocol, PUCCH resources corresponding to the PDCCH of the downlink subframes #0 and #1 will be reserved in a dynamic PUCCH region on the uplink subframes #4 and #7 respectively. Therefore, in this case, when the secondary serving cell uses cross-carrier scheduling, the PUCCH resources of the secondary serving cell can be obtained by using a mode of an implicit mapping with the PDCCH. When the cross-carrier scheduling is used in the secondary serving cell, the PUCCH resources corresponding to the secondary serving cell can be determined by using a mode of higher layer configuration with dynamic indication signaling. Alternatively, no matter whether the secondary serving cell is configured to use cross-carrier scheduling, the PUCCH resources corresponding to the secondary serving cell can be determined by using a mode of higher layer configuration with dynamic indication signaling.

Specific Embodiment 3

Specific Embodiment 3-1-1

Figure 6:
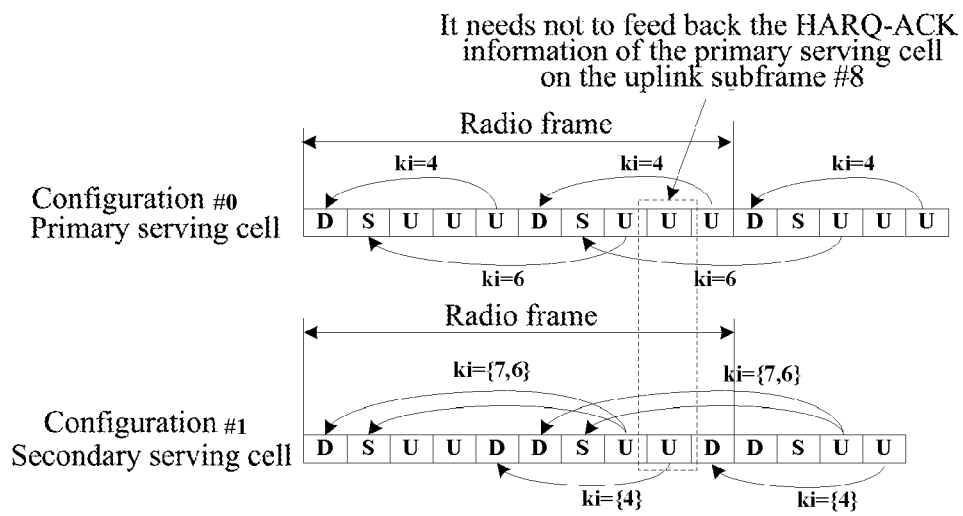
FIG. 6 is another diagram of a timing relationship between the PDSCH and the HARQ-ACK of primary and secondary serving cells during aggregation of configuration #0 and configuration #1.

The present embodiment relates to that aggregation uses a candidate scheme 2 in a second category of scenario. As shown in FIG. 6, a serving cell using an uplink-downlink configuration #0 and a serving cell using an uplink-downlink configuration #1 are aggregated, and the serving cell using the uplink-downlink configuration #0 is configured as a primary serving cell and the serving cell using an uplink-downlink configuration #1 is a secondary serving cell.

As the secondary serving cell uses the timing relationship itself, in this case, it needs to feed back the HARQ-ACK information of the downlink subframe #4 of the secondary serving cell on the uplink subframe #8, but according to the timing relationship of the primary serving cell, it needs not to feed back the HARQ-ACK information of the primary serving cell on the uplink subframe #8, i.e., this belongs to case 1 of the patent document.

According to the processing mode 1-1 of case 1 in the embodiment of the patent document, the HARQ-ACK information corresponding to the PDSCH of the secondary serving cell will be fed back by using PUCCH format 1a/1b, wherein, the PUCCH resources needed to feed back the HARQ-ACK are determined by using a mode of higher layer configuration with PDCCH dynamic indication, and as $K_s$ on the uplink subframe #8 only comprises one element, it means that when it only needs to feed back the HARQ-ACK information of one downlink subframe of the secondary serving cell, the HARQ-ACK information is transmitted by using format 1a(corresponding to a secondary serving cell being configured to only include a transmission mode of one transmission block) or format 1b (corresponding to a secondary serving cell being configured to at most support a transmission mode of two transmission blocks);

According to the processing mode 1-2 of case 1 in the embodiment of the patent document, corresponding HARQ-ACK information will be fed back, by using a mode of PUCCH format 1b with channel selection when the TDD system configures multiple serving cells, wherein, a mapping table used during the PUCCH format 1b with channel selection is determined according to the size of $K_s$, here it corresponds to a case when M=1, when the secondary serving cell is configured to only include a transmission mode of one transmission block, a mapping table when A=2 is used, and when the secondary serving cell is configured to support a transmission mode of two transmission blocks, a mapping table when A=3 is used, wherein, the HARQ-ACK information of the primary serving cell in the mapping table is set as a DTX state, and the PUCCH resources corresponding to the secondary serving cell are obtained by using a mode of higher layer configuration with dynamic indication signaling.

According to the processing mode 1-3 of case 1 in the embodiment of the patent document, corresponding HARQ-ACK information will be fed back, by using a mode of PUCCH format 1b with channel selection when the TDD system configures a single serving cell. In this embodiment, as $K_s$ only comprises one element, the process thereof is the same as the processing mode 1-1, and the description thereof will be omitted here.

Specific Embodiment 3-1-2

Figure 7:
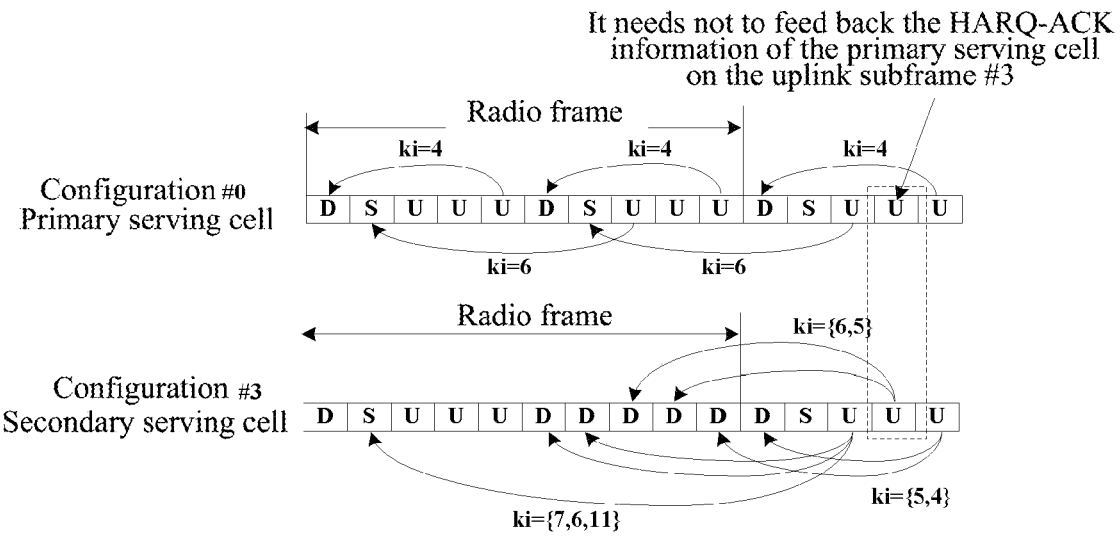
FIG. 7 is a diagram of a timing relationship between the PDSCH and the HARQ-ACK of primary and secondary serving cells during aggregation of configuration #0 and configuration #3.

The present embodiment relates to that aggregation uses a candidate scheme 2 in a second category of scenario. As shown in FIG. 7, a serving cell using an uplink-downlink configuration #0 and a serving cell using an uplink-downlink configuration #3 are aggregated, and the serving cell using the uplink-downlink configuration #0 is configured as a primary serving cell and the serving cell using an uplink-downlink configuration #3 is a secondary serving cell.

As the secondary serving cell uses the timing relationship itself, in this case, it needs to feed back the HARQ-ACK information of the downlink subframes #7 and #8 of one radio frame on the secondary serving cell on the uplink subframe #3, but according to the timing relationship of the primary serving cell, it needs not to feed back the HARQ-ACK information of the primary serving cell on the uplink subframe #3, i.e., this belongs to case 1 of the patent document.

According to the processing mode 1-1 of case 1 in the embodiment of the patent document, the HARQ-ACK information corresponding to the PDSCH of the secondary serving cell will be fed back by using PUCCH format 1b, wherein, the PUCCH resources needed to feed back the HARQ-ACK are determined by using a mode of higher layer configuration with PDCCH dynamic indication, and as $K_s$ on the uplink subframe #3 includes two elements, it means that it needs to feed back the HARQ-ACK information of two downlink subframes of the secondary serving cell on the uplink subframe, the spatial bundling (i.e., spatial logic AND operation) is performed on HARQ-ACK information of the downlink subframes #7 and #8 of the secondary serving cell, to obtain 2-bit HARQ-ACK information corresponding to the two downlink subframes, and the 2-bit HARQ-ACK information is transmitted by using format 1b;

According to the processing mode 1-2 of case 1 in the embodiment of the patent document, corresponding HARQ-ACK information will be fed back, by using a mode of PUCCH format 1b with channel selection when the TDD system configures multiple serving cells, wherein, a mapping table used during the PUCCH format 1b with channel selection is determined according to the size of $K_s$, here it corresponds to a case when M=2 and A=4, the HARQ-ACK information of the primary serving cell in the mapping table is set as a DTX state, and two PUCCH resources corresponding to the secondary serving cell are obtained by using a mode of higher layer configuration with dynamic indication signaling.

According to the processing mode 1-3 of case 1 in the embodiment of the patent document, corresponding HARQ-ACK information will be fed back, by using a mode of PUCCH format 1b with channel selection when the TDD system configures a single serving cell. Here, it corresponds to a case when M=2, and the PUCCH resource corresponding to various downlink subframes of the secondary serving cell are obtained by using a mode of higher layer configuration with dynamic signaling indication.

Embodiment 3-1-3

Figure 8:
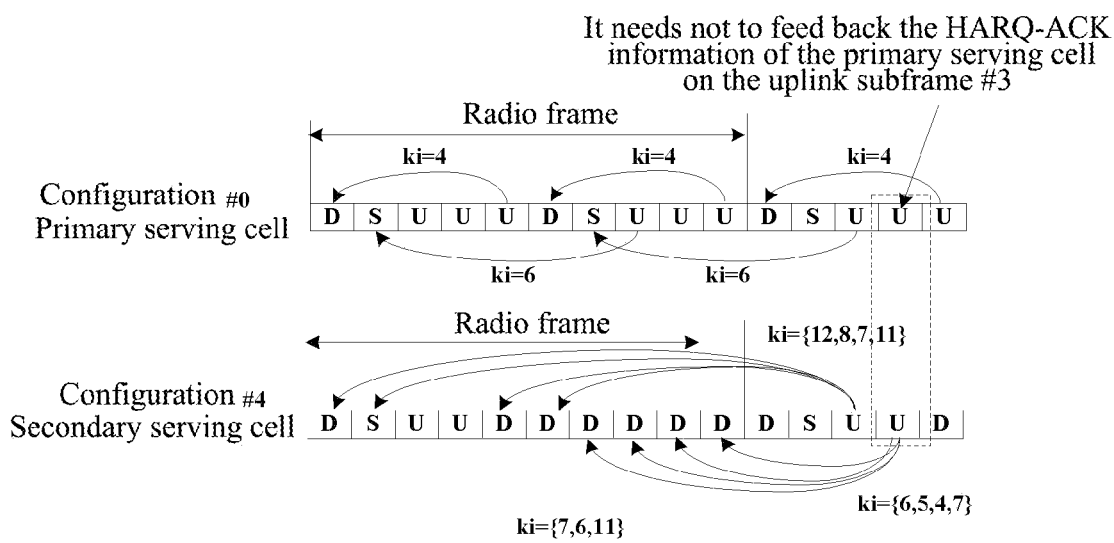
FIG. 8 is a diagram of a timing relationship between the PDSCH and the HARQ-ACK of primary and secondary serving cells during aggregation of configuration #0 and configuration #4.

The present embodiment relates to that aggregation uses a candidate scheme 2 in a second category of scenario. As shown in FIG. 8, a serving cell using an uplink-downlink configuration #0 and a serving cell using an uplink-downlink configuration #4 are aggregated, and the serving cell using the uplink-downlink configuration #0 is configured as a primary serving cell and the serving cell using an uplink-downlink configuration #4 is a secondary serving cell.

As the secondary serving cell uses the timing relationship itself, in this case, it needs to feed back the HARQ-ACK information of the downlink subframes #6, #7, #8 and #9 one radio frame on the secondary serving cell on the uplink subframe #3, but according to the timing relationship of the primary serving cell, it needs not to feed back the HARQ-ACK information of the primary serving cell on the uplink subframe #3, i.e., this belongs to case 1 of the patent document.

According to the processing mode 1-1 of case 1 in the embodiment of the patent document, the HARQ-ACK information corresponding to the PDSCH of the secondary serving cell will be fed back by using PUCCH format 1b, wherein, the PUCCH resources needed to feed back the HARQ-ACK are determined by using a mode of higher layer configuration with PDCCH dynamic indication, and as $K_s$ on the uplink subframe #3 includes four elements, it means that it needs to feed back the HARQ-ACK information of four downlink subframes of the secondary serving cell on the uplink subframe, the HARQ-ACK spatial bundling (i.e., spatial logic AND operation) and then time-domain bundling operation are performed on the HARQ-ACK information of the four downlink subframes of the secondary serving cell, to obtain 2-bit information b(0)b(1), and the 2-bit information b(0)b(1) is then transmitted by using format 1b;

wherein, performing time-domain bundling operation to obtain the 2-bit information b(0)b(1) can be determined by using the mapping mode illustrated in the following table 12:

TABLE 12

Mapping relationship between the HARQ-ACK information and b(0)b(1)

| Number of ACKs in the HARQ-ACK information | b(0), b(1) |
|---|---|
| 0 or none (UE at least detects that one downlink allocation information is lost) | 0, 0 |
| 1 | 1, 1 |
| 2 | 1, 0 |
| 3 | 0, 1 |
| 4 | 1, 1 |

Alternatively, it can also be determined by using the following mode: ordering the multiple HARQ-ACK information after the spatial bundling according to an order of the sizes of the DL DAI in the PDCCH, and b(0)b(1) represents the number of ACKs which are continuously fed back in the ordered HARQ-ACK information. The Specific number is shown in the following table 13:

TABLE 13

Mapping relationship between
the HARQ-ACK response and b(0)b(1)

| Number of ACKs in the ordered HARQ-ACK response | b(0), b(1) |
|---|---|
| 0 | 0, 0 |
| 1 | 1, 1 |
| 2 | 1, 0 |
| 3 | 0, 1 |
| 4 | 1, 1 |

Here only specific implementations of two mapping relationships are illustrated, but the patent document does not exclude other mapping modes.

According to the processing mode 1-2 of case 1 in the embodiment of the patent document, corresponding HARQ-ACK information will be fed back, by using a mode of PUCCH format 1b with channel selection when the TDD system configures multiple serving cells, wherein, a mapping table used during the PUCCH format 1b with channel selection is determined according to a size of $K_s$, here it corresponds to a case when M=4, the HARQ-ACK information of the primary serving cell in the mapping table is set as a DTX state, and two PUCCH resources corresponding to the secondary serving cell are obtained by using a mode of higher layer configuration with dynamic indication signaling.

According to the processing mode 1-3 of case 1 in the embodiment of the patent document, corresponding HARQ-ACK information will be fed back, by using a mode of PUCCH format 1b with channel selection when the TDD system configures a single serving cell. Here, it corresponds to a case when M=4, and the PUCCH resources corresponding to various downlink subframes of the secondary serving cell are obtained by using a mode of higher layer configuration with dynamic signaling indication.

Embodiment 3-2

Figure 9:
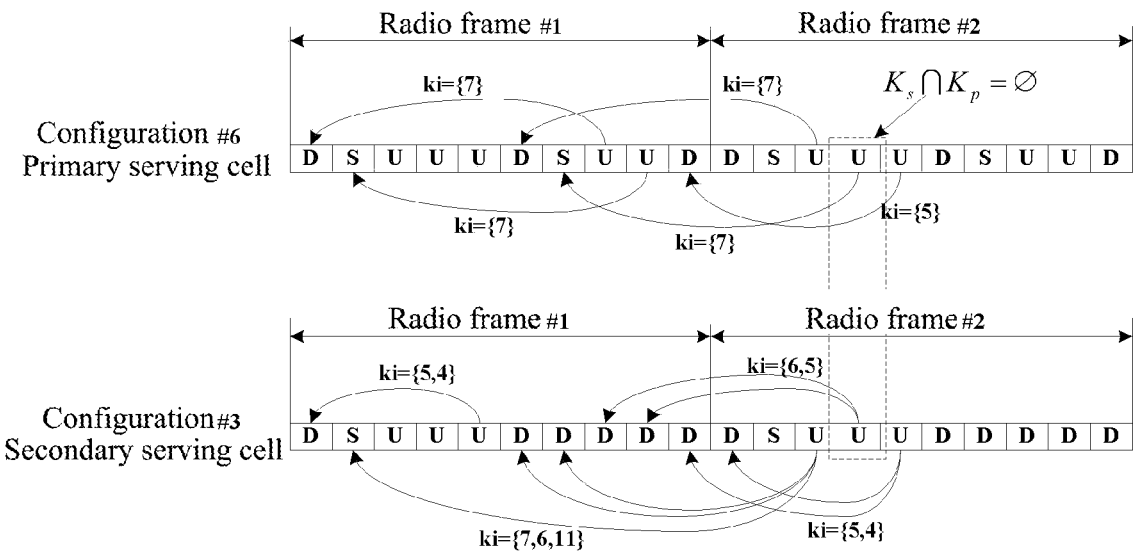
FIG. 9 is a diagram of a timing relationship between the PDSCH and the HARQ-ACK of primary and secondary serving cells during aggregation of configuration #6 and configuration #3.

The present embodiment relates to that aggregation uses a candidate scheme 2 in a second category of scenario. As shown in FIG. 9, a serving cell using an uplink-downlink configuration #6 and a serving cell using an uplink-downlink configuration #3 are aggregated, and the serving cell using the uplink-downlink configuration #6 is configured as a primary serving cell and the serving cell using an uplink-downlink configuration #3 is a secondary serving cell.

As the secondary serving cell uses the timing relationship itself, in this case, it needs to feed back on the uplink subframe #3 the HARQ-ACK information of the downlink subframe #6 of one radio frame on the primary serving cell and the HARQ-ACK information of the downlink subframes #7 and #8 of one radio frame on the secondary serving cell. This case is equivalent to $K_s \cap K_p = \emptyset$ and $K_p \neq \emptyset$, i.e., belonging to case 2 of the patent document.

According to the processing mode of case 2 in the embodiment of the patent document, the terminal will feed back the HARQ-ACK information, by using a mode of PUCCH format 1b with channel selection when the TDD system configures multiple serving cells, wherein, a mapping table used during the PUCCH format 1b with channel selection is determined according to the one with a larger size in the sets of $K_s$ and $K_p$, that is, a mapping table corresponding to M=2 will be used, the HARQ-ACK information without corresponding downlink subframes (of the primary serving cell) in the mapping table is set as a DTX state and two PUCCH resources corresponding to the secondary serving cell are obtained by using a mode of higher layer configuration with dynamic indication signaling.

Embodiment 3-3-1

Figure 10:
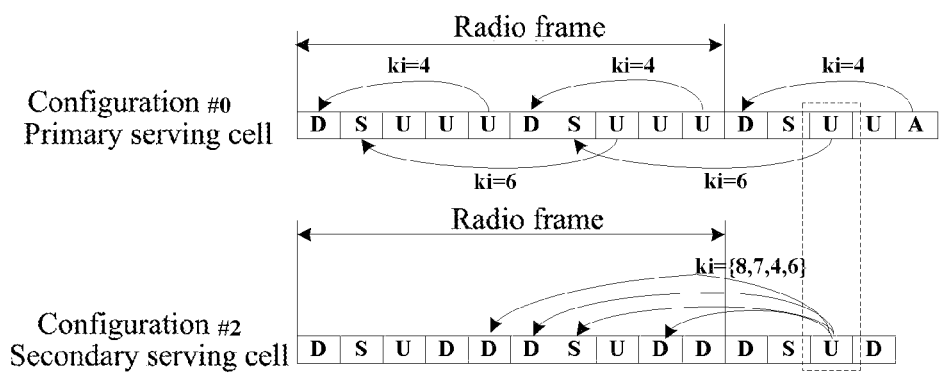
FIG. 10 is a diagram of a timing relationship between the PDSCH and the HARQ-ACK of primary and secondary serving cells during aggregation of configuration #0 and configuration #2.

The present embodiment relates to that aggregation uses a candidate scheme 2 in a second category of scenario. As shown in FIG. 10, a serving cell using an uplink-downlink configuration #0 and a serving cell using an uplink-downlink configuration #1 are aggregated, and the serving cell using the uplink-downlink configuration #0 is configured as a primary serving cell and the serving cell using an uplink-downlink configuration #1 is a secondary serving cell.

As the secondary serving cell uses the timing relationship itself, in this case, it needs to feed back on the uplink subframe #3 the HARQ-ACK information of the downlink subframe #6 of one radio frame on the primary serving cell and the HARQ-ACK information of the downlink subframes #4, #5, #6 and #8 of one radio frame on the secondary serving cell.

Although there is a common downlink subframe #6 in the set of downlink subframes of the primary and secondary serving cells, a downlink DAI value of the downlink subframe #6 in the bundling window corresponding to the uplink subframe #3 and secondary serving cell is 3 (here assume that the downlink subframes #4 and #5 of the secondary serving cell are scheduled at the same time). This case belongs to case 3-1 of the patent document, that is, the downlink subframe #6 commonly included in $K_s$ and $K_p$ is not a downlink subframe with DAI=1 or DAI=2 in the bundling window of the secondary serving cell. At this time, the terminal will feed back the HARQ-ACK information, by using a mode of PUCCH format 1b with channel selection when the TDD system configures multiple serving cells, wherein, a mapping table used during the PUCCH format 1b with channel selection is determined according to the one with a larger size in the sets of $K_s$ and $K_p$, that is, M=4, the HARQ-ACK information without corresponding downlink subframes (the primary serving cell) in the mapping table is set as a DTX state and two PUCCH resources corresponding to the secondary serving cell are obtained by using a mode of higher layer configuration with dynamic indication signaling.

Embodiment 3-3-2

The scenario related in the present embodiment is basically the same as that of embodiment 3-3-1. The difference is that downlink subframes #4 and #5 of the secondary serving cell are not scheduled, and the downlink subframe #6 is scheduled. The corresponding downlink DAI value of the downlink subframe #6 in the bundling window corresponding to the uplink subframe #3 and the secondary serving cell is 1 or 2. This case belongs to case 3-2 of the patent document. That is, the downlink subframe #6 commonly included in $K_s$ and $K_p$ is a downlink subframe with DAI=1 or 2 in the bundling window of the secondary serving cell. At this time, as the PUCCH resources corresponding to the PDCCH of the downlink subframe #6 are reserved in the dynamic PUCCH region on the uplink subframe #3, when the secondary serving cell uses cross-carrier scheduling, one PUCCH resource $n_{PUCCH,2}^{(1)}$ or $n_{PUCCH,3}^{(1)}$ corresponding to the secondary serving cell is determined according to an implicit mapping relationship with a Control Channel Element (CCE) of the PDCCH with DAI=1 or DAI=2, and the other PUCCH resource $n_{PUCCH,3}^{(1)}$ or $n_{PUCCH,2}^{(1)}$ is determined by using a mode of higher layer configuration with PDCCH dynamic indication; when the secondary serving cell does not use the cross-carrier scheduling, two PUCCH resources ($n_{PUCCH,2}^{(1)}$, $n_{PUCCH,3}^{(1)}$) corresponding to the secondary serving cell are determined by using a mode of higher layer configuration with PDCCH dynamic indication; or no matter whether the secondary serving cell uses the cross-carrier scheduling, both two PUCCH resources ($n_{PUCCH,2}^{(1)}, n_{PUCCH,3}^{(1)}$) corresponding to the secondary serving cell are determined by using a mode of higher layer configuration with dynamic indication signaling.

In addition, the determination of the mapping table and the processing mode when the secondary serving cell does not receive the HARQ-ACK information of the downlink subframe are the same as those of embodiment 3-3-1, and the description thereof will be omitted here.

Embodiment 3-3-3

Figure 11:
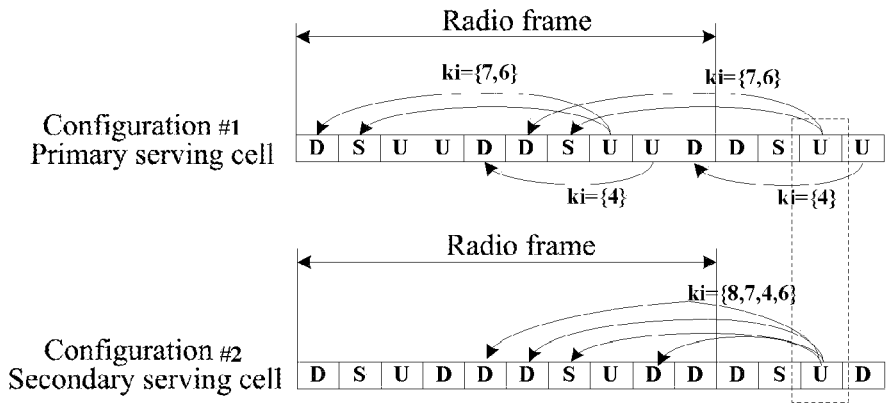
FIG. 11 is a diagram of a timing relationship between the PDSCH and the HARQ-ACK of primary and secondary serving cells during aggregation of configuration #1 and configuration #2.

The present embodiment relates to that aggregation uses a candidate scheme 2 in a second category of scenario. As shown in FIG. 11, a serving cell using an uplink-downlink configuration #1 and a serving cell using an uplink-downlink configuration #2 are aggregated, and the serving cell using the uplink-downlink configuration #1 is configured as a primary serving cell and the serving cell using an uplink-downlink configuration #2 is a secondary serving cell. As the secondary serving cell uses the timing relationship itself, in this case, it needs to feed back on the uplink subframe #3 the HARQ-ACK information of the downlink subframe #5/6 of one radio frame on the primary serving cell and the HARQ-ACK information of the downlink subframes #4, #5, #6 and #8 of one radio frame on the secondary serving cell.

Although there are common downlink subframes #5 and #6 in the set of downlink subframes of the primary and secondary serving cells, downlink DAI values of the downlink subframes #5 and #6 in the bundling window corresponding to the uplink subframe #3 and the secondary serving cell are 2 and 3 respectively (here assume that the downlink subframes #4 and #5 of the secondary serving cell are scheduled at the same time). This case belongs to case 3-2 of the patent document, that is, the downlink subframe #5 commonly included in $K_s$ and $K_p$ is a downlink subframe with DAI=1 in the bundling window of the secondary serving cell. At this time, as the PUCCH resources corresponding to the PDCCH of the downlink subframe #5 are reserved in the dynamic PUCCH region on the uplink subframe #3, one PUCCH resource in the secondary serving cell can be obtained by using a mode of an implicit mapping with the PDCCH, and the other PUCCH resource is obtained by using a mode of higher layer configuration with dynamic indication signaling.

Assume that the downlink subframe #4 of the secondary serving cell is not scheduled, and the downlink subframes #5 and #6 are scheduled. The corresponding downlink DAI values of the downlink subframes #5 and #6 in the bundling window corresponding to the uplink subframe #3 and the secondary serving cell are 1 and 2. This case belongs to case 3-3 of the patent document. That is, the downlink subframe #6 commonly included in $K_s$ and $K_p$ is a downlink subframe with DAI=1 and 2 in the bundling window of the secondary serving cell. At this time, as the PUCCH resources corresponding to the PDCCH of the downlink subframes #5 and #6 are reserved in the dynamic PUCCH region on the uplink subframe #3, when secondary serving cell uses cross-carrier scheduling, two PUCCH resources ($n_{PUCCH,2}^{(1)}, n_{PUCCH,3}^{(1)}$) corresponding to the secondary serving cell are determined according to an implicit mapping relationship with indexes of CCEs of the PDCCH with DAI=1 and DAI=2 respectively; and when the secondary serving cell does not use the cross-carrier scheduling, two PUCCH resources ($n_{PUCCH,2}^{(1)}, n_{PUCCH,3}^{(1)}$) corresponding to the secondary serving cell are determined by using a mode of higher layer configuration with PDCCH dynamic indication; or no matter whether the secondary serving cell uses the cross-carrier scheduling, both two PUCCH resources ($n_{PUCCH,2}^{(1)}, n_{PUCCH,3}^{(1)}$) corresponding to the secondary serving cell are determined by using a mode of higher layer configuration with dynamic indication signaling.

Figure 13:
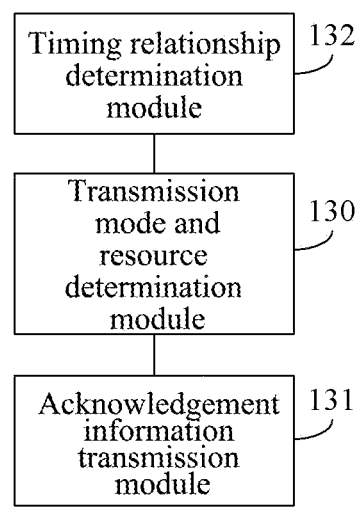
FIG. 13 is a structural diagram of an apparatus for transmitting HARQ-ACK information according to an embodiment of the patent document.

In addition, the embodiments of the patent document further provide an apparatus for transmitting HARQ-ACK information. As shown in FIG. 13, the apparatus primarily comprises:

a transmission mode and resource determination module 130, configured to determine, according to a relationship between sets of downlink subframes of aggregated serving cells in a feedback window corresponding to an uplink subframe, a transmission mode of the HARQ-ACK information of a serving cell and used PUCCH resources when transmitting the HARQ-ACK information; and an acknowledgement information transmission module 131, configured to transmit the HARQ-ACK information corresponding to PDSCH or SPS release PDCCH on the determined PUCCH resources by using the determined transmission mode of the HARQ-ACK information.

Preferably, the apparatus further comprises a timing relationship determination module 132, configured to determine the timing relationship between the PDSCH and the HARQ-ACK information of the secondary serving cell by the following mode:

when the set of downlink subframes under the uplink-downlink configuration of the secondary serving cell is a subset of a set of downlink subframes under the uplink-downlink configuration of a primary serving cell, the timing relationship between the PDSCH and the HARQ-ACK information of the secondary serving cell complying with a timing relationship between a PDSCH and HARQ-ACK information corresponding to the primary serving cell; and when the set of downlink subframes under the uplink-downlink configuration of the secondary serving cell is not a subset of the set of downlink subframes under the uplink-downlink configuration of the primary serving cell, the timing relationship between the PDSCH and the HARQ-ACK information of the secondary serving cell complying with the timing relationship between the PDSCH and the HARQ-ACK information corresponding to the primary serving cell or complying with a timing relationship between the PDSCH and the HARQ-ACK information corresponding to the secondary serving cell, or complying with a timing relationship between a PDSCH and a HARQ corresponding to a reference uplink-downlink configuration X; wherein, the reference uplink-downlink configuration X is an uplink-downlink configuration with a minimum set of downlink subframes in the uplink-downlink configurations satisfying the following conditions: the set of uplink subframes under the uplink-downlink configuration is not only a subset of the set of uplink subframes under the uplink-downlink configuration of the primary serving cell, but also a subset of the set of uplink subframes under the uplink-downlink configuration of the secondary serving cell.

Preferably, the transmission mode and resource determination module 130 is configured to determine, according to the timing relationship between the PDSCH and the HARQ-ACK information of the secondary serving cell determined by the timing relationship determination module, the set of downlink subframes of the aggregated serving cells in a feedback window corresponding to the uplink subframe.

Preferably, the transmission mode and resource determination module 130 is configured to: when the set of downlink subframes of the secondary serving cell corresponding to the uplink subframe is not a null set and the set of downlink subframes of the primary serving cell corresponding to the uplink subframe is a null set, transmit the HARQ-ACK information corresponding to the PDSCH of the secondary serving cell by using a mode of PUCCH format 1a or PUCCH format 1b, wherein PUCCH resources needed to transmit the HARQ-ACK information are determined by using a mode of higher layer configuration with dynamic indication signaling, or the PUCCH resources needed to transmit the HARQ-ACK information are determined only by using a mode of higher layer configuration; or transmit the HARQ-ACK information corresponding to the PDSCH of the serving cells, by using a mode of PUCCH format 1b with channel selection when the TDD system configures multiple serving cells, wherein a mapping table used during the PUCCH format 1b with channel selection is determined according to the size of a set of downlink subframes ($K_s$) of the secondary serving cell corresponding to the uplink subframe, the HARQ-ACK information of the primary serving cell in the mapping table is set as a Discontinuous Transmission (DTX) state, and the PUCCH resources corresponding to the secondary serving cell are determined by using a mode of higher layer configuration with dynamic indication signaling; or transmit the HARQ-ACK information corresponding to the PDSCH of the secondary serving cell, by using a mode of PUCCH format 1b with channel selection when the TDD system configures a single serving cell, wherein a mapping table used during the PUCCH format 1b with channel selection is determined according to the size of the set of downlink subframes ($K_s$) of the secondary serving cell corresponding to the uplink subframe, and the PUCCH resources corresponding to the downlink subframes corresponding to uplink subframes of the secondary serving cell are determined by using a mode of higher layer configuration with dynamic indication signaling.

Preferably, the transmission mode and resource determination module 130 is configured to determine the transmission mode of the HARQ-ACK information according to the size of the set of downlink subframes ($K_s$) of the secondary serving cell corresponding to the uplink subframe by the following mode:

when the number of elements comprised in $K_s$ is 1 or 2, transmitting the HARQ-ACK information corresponding to the PDSCH of the secondary serving cell by using a mode of PUCCH format 1a or PUCCH format 1b; and when the number of elements comprised in $K_s$ is more than 2, transmitting the HARQ-ACK information corresponding to the PDSCH of the serving cell, by using a mode of PUCCH format 1b with channel selection when the TDD system configures multiple serving cells or a single serving cell; or when the number of elements comprised in $K_s$ is 1, transmitting the HARQ-ACK information corresponding to the PDSCH of the secondary serving cell by using a mode of PUCCH format 1a or PUCCH format 1b; and when the number of elements comprised in $K_s$ is more than 1, transmitting the HARQ-ACK information corresponding to the PDSCH of the serving cell, by using a mode of PUCCH format 1b with channel selection when the TDD system configures multiple serving cells or a single serving cell.

Preferably, the transmission mode and resource determination module 130 is configured to: if it is determined that the HARQ-ACK information corresponding to the PDSCH of the secondary serving cell is transmitted by using a mode of PUCCH format 1a or PUCCH format 1b, when $K_s$ only comprises one element, i.e., the uplink subframes need to feed back HARQ-ACK information corresponding to the PDSCH of one downlink subframe of the secondary serving cell, if the secondary serving cell is configured to only comprise a transmission mode of one transport block, transmit the HARQ-ACK information corresponding to the PDSCH of the secondary serving cell by using a mode of PUCCH format 1a, and if the secondary serving cell is configured to at most support a transmission mode of two transport blocks, transmit the HARQ-ACK information corresponding to the PDSCH of the secondary serving cell by using a mode of PUCCH format 1b;

when $K_s$ comprises two elements, i.e., the uplink subframes need to feed back the HARQ-ACK information of two downlink subframes of the secondary serving cell, obtain 2-bit HARQ-ACK information corresponding to the two downlink subframes after performing spatial bundling on the HARQ-ACK information of the two downlink subframes, and transmit the 2-bit HARQ-ACK information by using a mode of PUCCH format 1b; and when $K_s$ comprises more than two elements, i.e., it needs to feed back HARQ-ACK information of more than two downlink subframes of the secondary serving cell on the uplink subframe, obtain 2-bit HARQ-ACK information after performing spatial bundling and then time-domain bundling operation on the HARQ-ACK information of the multiple downlink subframes, and then transmit the 2-bit HARQ-ACK information by using a mode of PUCCH format 1b.

Preferably, the transmission mode and resource determination module 130 is configured to: if it is determined that the HARQ-ACK information corresponding to the PDSCH of the serving cell is transmitted, by using a mode of PUCCH format 1b with channel selection when the TDD system configures multiple serving cells, when $K_s$ only comprises one element, i.e., the uplink subframes need to feed back HARQ-ACK information of one downlink subframe of the secondary serving cell, if the secondary serving cell is configured to only comprise a transmission mode of one transport block, use a channel selection mapping table of A=2 during the carrier aggregation of the TDD system, set the HARQ-ACK information corresponding to the primary serving cell as DTX, and obtain one PUCCH resource corresponding to the second serving cell by using a mode of higher layer configuration with dynamic indication signaling; and if the secondary serving cell is configured to support a transmission mode of two transport blocks, use a channel selection mapping table of A=3 during the carrier aggregation of the TDD system, set the HARQ-ACK information corresponding to the primary serving cell as DTX, and determine two PUCCH resources corresponding to the second serving cell by using a mode of higher layer configuration with dynamic indication signaling;

when $K_s$ comprises two elements, i.e., the uplink subframes need to feed back HARQ-ACK information of two downlink subframes of the secondary serving cell, obtain 2-bit HARQ-ACK information corresponding to the two downlink subframes after performing spatial bundling on the HARQ-ACK information of the two downlink subframes, use a channel selection mapping table of A=4 during the carrier aggregation of the TDD system, set the HARQ-ACK information corresponding to the primary serving cell as DTX, and determine two PUCCH resources corresponding to the second serving cell by using a mode of higher layer configuration with dynamic indication signaling;

when $K_s$ comprises more than two elements, i.e., it needs to feed back HARQ-ACK information of more than two downlink subframes of the secondary serving cell on the uplink subframe, obtain 2-bit HARQ-ACK information after performing spatial bundling and then time-domain bundling operation on the HARQ-ACK information of the multiple downlink subframes, then transmit the 2-bit HARQ-ACK information by using the PUCCH format 1b, use a channel selection mapping table of M=3 or M=4 (M is a size of $K_s$) during the carrier aggregation of the TDD system, set the HARQ-ACK information corresponding to the primary serving cell as DTX, and determine two PUCCH resources corresponding to the second serving cell by using a mode of higher layer configuration with dynamic indication signaling.

Preferably, the transmission mode and resource determination module 130 is configured to: if it is determined that the HARQ-ACK information corresponding to the PDSCH of the secondary serving cell is transmitted, by using a mode of PUCCH format 1b with channel selection when the TDD system configures a single serving cell, when $K_s$ only comprises one element, i.e., the uplink subframes need to feed back HARQ-ACK information of one downlink subframe of the secondary serving cell, if the secondary serving cell is configured to only comprise a transmission mode of one transport block, transmit the HARQ-ACK information corresponding to the PDSCH of the secondary serving cell by using a mode of PUCCH format 1a, and if the secondary serving cell is configured to at most support a transmission mode of two transport blocks, transmit the HARQ-ACK information corresponding to the PDSCH of the secondary serving cell by using a mode of PUCCH format 1b; and determine the corresponding PUCCH resources when transmitting the HARQ-ACK information by using a mode of higher layer configuration with dynamic indication signaling; and when $K_s$ comprises more than one element, i.e., the uplink subframes need to feed back HARQ-ACK information of more than one downlink subframe of the secondary serving cell, obtain M-bit (M is a size of $K_s$) HARQ-ACK information corresponding to the downlink subframes after performing spatial bundling on the HARQ-ACK information of the downlink subframes, use a channel selection mapping table of M=2, M=3 or M=4 during a single service of the TDD system, and determine PUCCH resources corresponding to the downlink subframes corresponding to the uplink subframe of the second serving cell by using a mode of higher layer configuration with dynamic indication signaling.

Preferably, the transmission mode and resource determination module 130 is configured to when the set of downlink subframes ($K_s$) of the secondary serving cell corresponding to the uplink subframe is not a null set, the set of downlink subframes ($K_p$) of the primary serving cell corresponding to the uplink subframe is also not a null set, and an intersection set between $K_s$ and $K_p$ is a null set, transmit the HARQ-ACK information, by using a mode of PUCCH format 1b with channel selection when the TDD system configures multiple serving cells, wherein the mapping table used during the PUCCH format 1b with channel selection is determined according to one with a larger size in sets of $K_s$ and $K_p$, the HARQ-ACK information without corresponding downlink subframes in the mapping table is set as a DTX state, and the PUCCH resources corresponding to the secondary serving cell are determined by using a mode of higher layer configuration with dynamic indication signaling.

Preferably, the transmission mode and resource determination module 130 is configured to: when the set of downlink subframes ($K_s$) of the secondary serving cell corresponding to the uplink subframe is not a null set, the set of downlink subframes ($K_p$) of the primary serving cell corresponding to the uplink subframe is also not a null set, and an intersection set between $K_s$ and $K_p$ is not a null set, if downlink subframes with downlink DAI=1 and DAI=2 in the feedback window of the secondary serving cell are not included in the downlink subframes corresponding to the intersection set between $K_s$ and $K_p$, transmit the HARQ-ACK information corresponding to the PDSCH of the serving cell, by using a mode of PUCCH format 1b with channel selection when the TDD system configures multiple serving cells, wherein, the mapping table used during PUCCH format 1b with channel selection is determined according to one with a larger size in the sets of $K_s$ and $K_p$, the HARQ-ACK information without corresponding downlink subframes in the mapping table is set as a DTX state, and the two PUCCH resources ($n_{PUCCH,2}^{(1)}$, $n_{PUCCH,3}^{(1)}$) corresponding to the secondary serving cell are determined by using a mode of higher layer configuration with dynamic indication signaling;

if one downlink subframe with downlink DAI=1 or DAI=2 in the feedback window of the secondary serving cell is included in the downlink subframes corresponding to the intersection set between $K_s$ and $K_p$, transmit the HARQ-ACK information corresponding to the PDSCH of the serving cell, by using a mode of PUCCH format 1b with channel selection when the TDD system configures multiple serving cells, wherein, the mapping table used during PUCCH format 1b with channel selection is determined according to one with a larger size in the sets of $K_s$ and $K_p$, the HARQ-ACK information without corresponding downlink subframes in the mapping table is set as a DTX state, and when the secondary serving cell uses cross-carrier scheduling, one PUCCH resource $n_{PUCCH,2}^{(1)}$ or $n_{PUCCH,3}^{(1)}$ corresponding to the secondary serving cell is determined according to an implicit mapping relationship with a Control Channel Element (CCE) of the Physical Downlink Control Channel (PDCCH) with DAI=1 or DAI=2, and the other PUCCH resource $n_{PUCCH,3}^{(1)}$ or $n_{PUCCH,2}^{(1)}$ is determined by using a mode of higher layer configuration with PDCCH dynamic indication; when the secondary serving cell does not use the cross-carrier scheduling, two PUCCH resources ($n_{PUCCH,2}^{(1)}$, $n_{PUCCH,3}^{(1)}$) corresponding to the secondary serving cell are determined by using a mode of higher layer configuration with PDCCH dynamic indication; or no matter whether the secondary serving cell uses the cross-carrier scheduling, both two PUCCH resources ($n_{PUCCH,2}^{(1)}$, $n_{PUCCH,3}^{(1)}$) corresponding to the secondary serving cell are determined by using a mode of higher layer configuration with dynamic indication signaling; and if downlink subframes with downlink DAI=1 and DAI=2 in the feedback window of the secondary serving cell are included in the downlink subframes corresponding to the intersection set between $K_s$ and $K_p$, transmit the HARQ-ACK information corresponding to the PDSCH of the serving cell, by using a mode of PUCCH format 1b with channel selection when the TDD system configures multiple serving cells, wherein, the mapping table used during PUCCH format 1b with channel selection is determined according to one with a larger size in the sets of $K_s$ and $K_p$, the HARQ-ACK information without corresponding downlink subframes in the mapping table is set as a DTX state, and when the secondary serving cell uses cross-carrier scheduling, two PUCCH resources ($n_{PUCCH,2}^{(1)}$, $n_{PUCCH,3}^{(1)}$) corresponding to the secondary serving cell are determined according to an implicit mapping relationship with indexes of Control Channel Elements (CCEs) of the PDCCH with DAI=1 and DAI=2 respectively; and when the secondary serving cell does not use the cross-carrier scheduling, two PUCCH resources ($n_{PUCCH,2}^{(1)}, n_{PUCCH,3}^{(1)}$) corresponding to the secondary serving cell are determined by using a mode of higher layer configuration with PDCCH dynamic indication; or no matter whether the secondary serving cell uses the cross-carrier scheduling, both two PUCCH resources ($n_{PUCCH,2}^{(1)}, n_{PUCCH,3}^{(1)}$) corresponding to the secondary serving cell are determined by using a mode of higher layer configuration with dynamic indication signaling.

Preferably, the transmission mode and resource determination module 130 is configured to: when the set of downlink subframes ($K_s$) of the secondary serving cell corresponding to the uplink subframe is one subset of the set of downlink subframes ($K_p$) of the primary serving cell corresponding to the uplink subframe, or $K_s$ is equal to $K_p$, when the secondary serving cell uses cross-carrier scheduling, determine the PUCCH resources corresponding to the secondary serving cell according to an implicit mapping relationship between the PUCCH resources and the indexes of the CCEs of the PDCCH; and when the secondary serving cell does not use the cross-carrier scheduling, determine the PUCCH resources corresponding to the secondary serving cell by using a mode of higher layer configuration with dynamic indication signaling; or no matter whether the secondary serving cell uses the cross-carrier scheduling, determine the PUCCH resources corresponding to the secondary serving cell by using a mode of higher layer configuration with dynamic indication signaling.

In conclusion, according to the above embodiments of the patent document, a method and apparatus for transmitting HARQ-ACK information are provided. The patent document can implement transmission of HARQ-ACK information when serving cells with different uplink downlink configurations are aggregated by bundling HARQ-ACK responses of downlink subframes of serving cells in a feedback window corresponding to a specified uplink subframe. It should be illustrated that the apparatus for transmitting HARQ-ACK information described in the above apparatus embodiment corresponds to the above method embodiment. The specific implementation thereof has been described in detail in the method embodiment, and will not be described here any more.

The above description is only the preferred embodiments of the patent document and is not intended to limit the patent document. The patent document can have a plurality of other embodiments. Without departing from the spirit and substance of the patent document, those skilled in the art can make various corresponding changes and variations according to the patent document, but all these corresponding changes and variations should belong to the protection scope of the appended claims in the patent document.

Obviously, those skilled in the art should understand that each module or each step of the aforementioned patent document can be implemented with general computing devices, and can be integrated in a single computing device, or distributed onto a network composed of a plurality of computing devices; alternatively, they can be implemented with program codes executable by the computing devices, and therefore, they can be stored in storage devices to be executed by the computing devices; and in some cases, the steps shown or described can be performed in a different order from those here; alternatively, they are respectively made into a plurality of integrated circuit modules; alternatively, it is implemented with making several modules or steps of them into a single integrated circuit module. The patent document is not limited to any specific combinations of hardware and software.

Industrial Applicability

The above embodiments solve the problem that the PUCCH resources can not be determined when carrier aggregation is performed on serving cells with different uplink-downlink configurations and a mode of PUCCH format 1b with channel selection is configured to feed back the HARQ-ACK.

What is claimed is:

1. A method for transmitting Hybrid Automatic Repeat Request Acknowledgement (HARQ-ACK) information, comprising:

in a Carrier Aggregation (CA) Time Division Duplex (TDD) system, aggregated serving cells comprising a primary serving cell and a secondary serving cell, when uplink-downlink configurations of the aggregated serving cells are different, and a mode of Physical Uplink Control Channel (PUCCH) format 1b with channel selection is configured to be used to feed back the HARQ-ACK, determining, according to a timing relationship between a Physical Downlink Shared Channel (PDSCH) and the HARQ-ACK information complied by the secondary serving cell, sets of downlink subframes of aggregated serving cells in a feedback window corresponding to an uplink subframe;

determining, according to a relationship between the sets of downlink subframes of the aggregated serving cells in the feedback window corresponding to the uplink subframe, a transmission mode of the HARQ-ACK information and used PUCCH resources when transmitting the HARQ-ACK information; and transmitting the HARQ-ACK information on the determined PUCCH resources by using the determined transmission mode of the HARQ-ACK information;

wherein, the timing relationship between the PDSCH and the HARQ-ACK information of the secondary serving cell is determined by the following mode:

when a set of downlink subframes under an uplink-downlink configuration of the secondary serving cell is a subset of a set of downlink subframes under an uplink-downlink configuration of the primary serving cell, the timing relationship between the PDSCH and the HARQ-ACK information of the secondary serving cell complying with a timing relationship between a PDSCH and HARQ-ACK information corresponding to the primary serving cell; and when the set of downlink subframes under the uplink-downlink configuration of the secondary serving cell is not a subset of the set of downlink subframes under the uplink-downlink configuration of the primary serving cell, the timing relationship between the PDSCH and the HARQ-ACK information of the secondary serving cell complying with the timing relationship between the PDSCH and the HARQ-ACK information corresponding to the primary serving cell or complying with the timing relationship between the PDSCH and the HARQ-ACK information corresponding to the secondary serving cell, or complying with a timing relationship between a PDSCH and a HARQ corresponding to a reference uplink-downlink configuration X; wherein, the reference uplink-downlink configuration X is an uplink-downlink configuration with a minimum set of downlink subframes in uplink-downlink configurations satisfying following conditions: a set of uplink subframes under the uplink-downlink configuration is not only a subset of a set of uplink subframes under the uplink-downlink configuration of the primary serving cell, but also a subset of a set of uplink subframes under the uplink-downlink configuration of the secondary serving cell.

2. The method according to claim 1, wherein, determining, according to the relationship between the sets of downlink subframes of the aggregated serving cells in the feedback window corresponding to the uplink subframe, the transmission mode of the HARQ-ACK information and the used PUCCH resources when transmitting the HARQ-ACK information comprises:

when the set of downlink subframes of the secondary serving cell corresponding to the uplink subframe is not a null set and the set of downlink subframes of the primary serving cell corresponding to the uplink subframe is a null set, transmitting the HARQ-ACK information corresponding to the PDSCH of the secondary serving cell by using a mode of PUCCH format 1a or PUCCH format 1b, wherein PUCCH resources needed to transmit the HARQ-ACK information are determined by using a mode of higher layer configuration with dynamic indication signaling, or PUCCH resources needed to transmit the HARQ-ACK information are determined only by using a mode of higher layer configuration; or transmitting HARQ-ACK information corresponding to PDSCH of serving cells, by using a mode of PUCCH format 1b with channel selection when a TDD system configures multiple serving cells, wherein a mapping table used during the PUCCH format 1b with channel selection is determined according to a size of a set of downlink subframes ($K_s$) of the secondary serving cell corresponding to the uplink subframe, the HARQ-ACK information of the primary serving cell in the mapping table is set as a Discontinuous Transmission (DTX) state, and PUCCH resources corresponding to the secondary serving cell are determined by using a mode of higher layer configuration with dynamic indication signaling; or transmitting the HARQ-ACK information corresponding to the PDSCH of the secondary serving cell, by using a mode of PUCCH format 1b with channel selection when a TDD system configures a single serving cell, wherein a mapping table used during the PUCCH format 1b with channel selection is determined according to a size of a set of downlink subframes ($K_s$) of the secondary serving cell corresponding to the uplink subframe, and PUCCH resources corresponding to downlink subframes corresponding to an uplink subframe of the secondary serving cell are determined by using a mode of higher layer configuration with dynamic indication signaling; or determining the transmission mode of the HARQ-ACK information according to a size of a set of downlink subframes ($K_s$) of the secondary serving cell corresponding to the uplink subframe by using one of the following modes: a mode of PUCCH format 1a, a mode of PUCCH format 1b, a mode of PUCCH format 1b with channel selection when a TDD system configures multiple serving cells, or a mode of PUCCH format 1b with channel selection when the TDD system configures a single serving cell.

3. The method according to claim 2, wherein, determining the transmission mode of the HARQ-ACK information according to the size of $K_s$ comprises:

when the number of elements comprised in $K_s$ is 1 or 2, transmitting the HARQ-ACK information corresponding to the PDSCH of the secondary serving cell by using a mode of PUCCH format 1a or PUCCH format 1b; and when the number of elements comprised in $K_s$ is more than 2, transmitting the HARQ-ACK information corresponding to the PDSCH of the serving cell by using a mode of PUCCH format 1b with channel selection when the TDD system configures multiple serving cells or a single serving cell; or when the number of elements comprised in $K_s$ is 1, transmitting the HARQ-ACK information corresponding to the PDSCH of the secondary serving cell by using a mode of PUCCH format 1a or PUCCH format 1b; and when the number of elements comprised in $K_s$ is more than 1, transmitting the HARQ-ACK information corresponding to the PDSCH of the serving cell by using a mode of PUCCH format 1b with channel selection when the TDD system configures multiple serving cells or a single serving cell.

4. The method according to claim 2, wherein, if determining that the HARQ-ACK information corresponding to the PDSCH of the secondary serving cell is transmitted by using a mode of PUCCH format 1a or PUCCH format 1b, when $K_s$ only comprises one element, i.e., the uplink subframes need to feed back HARQ-ACK information corresponding to the PDSCH of one downlink subframe of the secondary serving cell, if the secondary serving cell is configured to only comprise a transmission mode of one transport block, transmitting the HARQ-ACK information corresponding to the PDSCH of the secondary serving cell by using a mode of PUCCH format 1a, and if the secondary serving cell is configured to at most support a transmission mode of two transport blocks, transmitting the HARQ-ACK information corresponding to the PDSCH of the secondary serving cell by using a mode of PUCCH format 1b;

when $K_s$ comprises two elements, i.e., the uplink subframes need to feed back HARQ-ACK information of two downlink subframes of the secondary serving cell, obtaining 2-bit HARQ-ACK information corresponding to the two downlink subframes after performing spatial bundling on the HARQ-ACK information of the two downlink subframes, and transmitting the 2-bit HARQ-ACK information by using a mode of PUCCH format 1b; and when $K_s$ comprises more than two elements, i.e., the uplink subframes need to feed back HARQ-ACK information of more than two downlink subframes of the secondary serving cell, obtaining 2-bit HARQ-ACK information after performing spatial bundling and then time-domain bundling operation on the HARQ-ACK information of the multiple downlink subframes, and then transmitting the 2-bit HARQ-ACK information by using a mode of PUCCH format 1b.

5. The method according to claim 2, wherein, if determining that the HARQ-ACK information corresponding to the PDSCH of the serving cell is transmitted by using a mode of PUCCH format 1b with channel selection when the TDD system configures multiple serving cells, when $K_s$ only comprises one element, i.e., the uplink subframes need to feed back HARQ-ACK information of one downlink subframe of the secondary serving cell, if the secondary serving cell is configured to only comprise a transmission mode of one transport block, using a channel selection mapping table of A=2 during carrier aggregation of the TDD system, setting the HARQ-ACK information corresponding to the primary serving cell as DTX, and obtaining one PUCCH resource corresponding to the second serving cell by using a mode of higher layer configuration with dynamic indication signaling; and if the secondary serving cell is configured to support a transmission mode of two transport blocks, using a channel selection mapping table of A=3 during the carrier aggregation of the TDD system, setting the HARQ-ACK information corresponding to the primary serving cell as DTX, and determining two PUCCH resources corresponding to the second serving cell by using a mode of higher layer configuration with dynamic indication signaling;

when $K_s$ comprises two elements, i.e., the uplink subframes need to feed back HARQ-ACK information of two downlink subframes of the secondary serving cell, obtaining 2-bit HARQ-ACK information corresponding to the two downlink subframes after performing spatial bundling on the HARQ-ACK information of the two downlink subframes, using a channel selection mapping table of A=4 during the carrier aggregation of the TDD system, setting the HARQ-ACK information corresponding to the primary serving cell as DTX, and determining two PUCCH resources corresponding to the second serving cell by using a mode of higher layer configuration with dynamic indication signaling;

when $K_s$ comprises more than two elements, i.e., the uplink subframes need to feed back HARQ-ACK information of more than two downlink subframes of the secondary serving cell, obtaining 2-bit HARQ-ACK information after performing spatial bundling and then time-domain bundling operation on the HARQ-ACK information of the multiple downlink subframes, then transmitting the 2-bit HARQ-ACK information by using the PUCCH format 1b, using a channel selection mapping table of M=3 or M=4 (M is a size of $K_s$) during the carrier aggregation of the TDD system, setting the HARQ-ACK information corresponding to the primary serving cell as DTX, and determining two PUCCH resources corresponding to the second serving cell by using a mode of higher layer configuration with dynamic indication signaling.

6. The method according to claim 2, wherein, if determining that the HARQ-ACK information corresponding to the PDSCH of the secondary serving cell is transmitted by using a mode of PUCCH format 1b with channel selection when the TDD system configures a single serving cell, when $K_s$ only comprises one element, i.e., the uplink subframes need to feed back HARQ-ACK information of one downlink subframe of the secondary serving cell, if the secondary serving cell is configured to only comprise a transmission mode of one transport block, transmitting the HARQ-ACK information corresponding to the PDSCH of the secondary serving cell by using a mode of PUCCH format 1a, and if the secondary serving cell is configured to at most support a transmission mode of two transport blocks, transmitting the HARQ-ACK information corresponding to the PDSCH of the secondary serving cell by using a mode of PUCCH format 1b; and determining corresponding PUCCH resources by using a mode of higher layer configuration with dynamic indication signaling when transmitting the HARQ-ACK information; and when $K_s$ comprises more than one element, i.e., the uplink subframes need to feed back HARQ-ACK information of more than one downlink subframe of the secondary serving cell, obtaining M-bit (M is a size of $K_s$) HARQ-ACK information corresponding to the downlink subframes after performing spatial bundling on the HARQ-ACK information of the downlink subframes, using a channel selection mapping table of M=2 or M=3 or M=4 during a single service of the TDD system, and determining PUCCH resources corresponding to the downlink subframes corresponding to the uplink subframe of the second serving cell by using a mode of higher layer configuration with dynamic indication signaling.

7. The method according to claim 1, wherein, determining, according to the relationship between the sets of downlink subframes of the aggregated serving cells in the feedback window corresponding to the uplink subframe, the transmission mode of the HARQ-ACK information and the used PUCCH resources when transmitting the HARQ-ACK information comprises:

when the set of downlink subframes ($K_s$) of the secondary serving cell corresponding to the uplink subframe is not a null set, the set of downlink subframes ($K_p$) of the primary serving cell corresponding to the uplink subframe is also not a null set, and an intersection set between $K_s$ and $K_p$ is a null set, transmitting the HARQ-ACK information by using a mode of PUCCH format 1b with channel selection when the TDD system configures multiple serving cells, wherein the mapping table used during the PUCCH format 1b with channel selection is determined according to one with a larger size in sets of $K_s$ and $K_p$, the HARQ-ACK information without corresponding downlink subframes in the mapping table is set as a Discontinuous Transmission (DTX) state, and the PUCCH resources corresponding to the secondary serving cell are determined by using a mode of higher layer configuration with dynamic indication signaling.

8. The method according to claim 1, wherein, determining, according to the relationship between the sets of downlink subframes of the aggregated serving cells in the feedback window corresponding to the uplink subframe, the transmission mode of the HARQ-ACK information and the used PUCCH resources when transmitting the HARQ-ACK information comprises:

when the set of downlink subframes ($K_s$) of the secondary serving cell corresponding to the uplink subframe is not a null set, the set of downlink subframes ($K_p$) of the primary serving cell corresponding to the uplink subframe is also not a null set, and an intersection set between $K_s$ and $K_p$ is not a null set, if downlink subframes with downlink Downlink Assignment Indicator (DAI)=1 and DAI=2 in the feedback window of the secondary serving cell are not included in downlink subframes corresponding to the intersection set between $K_s$ and $K_p$, transmitting the HARQ-ACK information corresponding to the PDSCH of the serving cell by using a mode of PUCCH format 1b with channel selection when the TDD system configures multiple serving cells, wherein, the mapping table used during PUCCH format 1b with channel selection is determined according to one with a larger size in the sets of $K_s$ and $K_p$, the HARQ-ACK information without corresponding downlink subframes in the mapping table is set as a DTX state, and the two PUCCH resources ($n_{PUCCH,2}^{(1)}$, $n_{PUCCH,3}^{(1)}$) corresponding to the secondary serving cell are determined by using a mode of higher layer configuration with dynamic indication signaling;

if one downlink subframe with downlink DAI=1 or DAI=2 in the feedback window of the secondary serving cell is included in the downlink subframes corresponding to the intersection set between $K_s$ and $K_p$, transmitting the HARQ-ACK information corresponding to the PDSCH of the serving cell by using a mode of PUCCH format 1b with channel selection when the TDD system configures multiple serving cells, wherein, the mapping table used during PUCCH format 1b with channel selection is determined according to one with a larger size in the sets of $K_s$ and $K_p$, the HARQ-ACK information without corresponding downlink subframes in the mapping table is set as a DTX state, and when the secondary serving cell uses cross-carrier scheduling, one PUCCH resource $n_{PUCCH,2}^{(1)}$ or $n_{PUCCH,3}^{(1)}$ corresponding to the secondary serving cell is determined according to an implicit mapping relationship with a Control Channel Element (CCE) of a Physical Downlink Control Channel (PDCCH) with DAI=1 or DAI=2, and the other PUCCH resource $n_{PUCCH,3}^{(1)}$ or $n_{PUCCH,2}^{(1)}$ is determined by using a mode of higher layer configuration with PDCCH dynamic indication; when the secondary serving cell does not use the cross-carrier scheduling, two PUCCH resources ($n_{PUCCH,2}^{(1)}$,$n_{PUCCH,3}^{(1)}$) corresponding to the secondary serving cell are determined by using a mode of higher layer configuration with PDCCH dynamic indication; or no matter whether the secondary serving cell uses the cross-carrier scheduling, both two PUCCH resources ($n_{PUCCH,2}^{(1)}$, $n_{PUCCH,3}^{(1)}$) corresponding to the secondary serving cell are determined by using a mode of higher layer configuration with dynamic indication signaling; and if downlink subframes with downlink DAI=1 and DAI=2 in the feedback window of the secondary serving cell are included in the downlink subframes corresponding to the intersection set between $K_s$ and $K_p$, transmitting the HARQ-ACK information corresponding to the PDSCH of the serving cell by using a mode of PUCCH format 1b with channel selection when the TDD system configures multiple serving cells, wherein, the mapping table used during PUCCH format 1b with channel selection is determined according to one with a larger size in the sets of $K_s$ and $K_p$, the HARQ-ACK information without corresponding downlink subframes in the mapping table is set as a DTX state, and when the secondary serving cell uses cross-carrier scheduling, two PUCCH resources ($n_{PUCCH,2}^{(1)}$,$n_{PUCCH,3}^{(1)}$) corresponding to the secondary serving cell are determined according to an implicit mapping relationship with indexes of Control Channel Elements (CCEs) of the PDCCH with DAI=1 and DAI=2 respectively; and when the secondary serving cell does not use the cross-carrier scheduling, two PUCCH resources ($n_{PUCCH,2}^{(1)}$,$n_{PUCCH,3}^{(1)}$) corresponding to the secondary serving cell are determined by using a mode of higher layer configuration with PDCCH dynamic indication; or no matter whether the secondary serving cell uses the cross-carrier scheduling, both two PUCCH resources ($n_{PUCCH,2}^{(1)}$,$n_{PUCCH,3}^{(1)}$) corresponding to the secondary serving cell are determined by using a mode of higher layer configuration with dynamic indication signaling.

9. The method according to claim 1, wherein, determining, according to the relationship between the sets of downlink subframes of the aggregated serving cells in the feedback window corresponding to the uplink subframe, the transmission mode of the HARQ-ACK information and the used PUCCH resources when transmitting the HARQ-ACK information comprises:

when the set of downlink subframes ($K_s$) of the secondary serving cell corresponding to the uplink subframe is one subset of the set of downlink subframes ($K_p$) of the primary serving cell corresponding to the uplink subframe, or $K_s$ is equal to $K_p$, when the secondary serving cell uses cross-carrier scheduling, determining PUCCH resources corresponding to the secondary serving cell according to an implicit mapping relationship between the PUCCH resources and indexes of CCEs of PDCCH; and when the secondary serving cell does not use the cross-carrier scheduling, determining the PUCCH resources corresponding to the secondary serving cell by using a mode of higher layer configuration with dynamic indication signaling; or no matter whether the secondary serving cell uses the cross-carrier scheduling, determining the PUCCH resources corresponding to the secondary serving cell by using a mode of higher layer configuration with dynamic indication signaling.

10. An apparatus for transmitting Hybrid Automatic Repeat Request Acknowledgement (HARQ-ACK) information, comprising:

a transmission mode and resource determination module, configured to determine, according to a relationship between sets of downlink subframes of aggregated serving cells in a feedback window corresponding to an uplink subframe, a transmission mode of the HARQ-ACK information and used Physical Uplink Control Channel (PUCCH) resources when transmitting the HARQ-ACK information; wherein, the aggregated serving cells comprises a primary serving cell and a secondary serving cell;

an acknowledgement information transmission module, configured to transmit HARQ-ACK information corresponding to Physical Downlink Shared Channel (PDSCH) or Semi-Persistent Scheduling (SPS) release Physical Downlink Control Channel (PDCCH) on the determined PUCCH resources by using the determined transmission mode of the HARQ-ACK information; and a timing relationship determination module, configured to determine a timing relationship between PDSCH and HARQ-ACK information of the secondary serving cell by the following mode:

when a set of downlink subframes under an uplink-downlink configuration of the secondary serving cell is a subset of a set of downlink subframes under an uplink-downlink configuration of the primary serving cell, the timing relationship between the PDSCH and the HARQ-ACK information of the secondary serving cell complying with a timing relationship between PDSCH and HARQ-ACK information corresponding to the primary serving cell; and when the set of downlink subframes under the uplink-downlink configuration of the secondary serving cell is not a subset of the set of downlink subframes under the uplink-downlink configuration of the primary serving cell, the timing relationship between the PDSCH and the HARQ-ACK information of the secondary serving cell complying with the timing relationship between the PDSCH and the HARQ-ACK information corresponding to the primary serving cell or complying with the timing relationship between the PDSCH and the HARQ-ACK information corresponding to the secondary serving cell, or complying with a timing relationship between a PDSCH and a HARQ corresponding to a reference uplink-downlink configuration X; wherein, the reference uplink-downlink configuration X is an uplink-downlink configuration with a minimum set of downlink subframes in uplink-downlink configurations satisfying following conditions: a set of uplink subframes under the uplink-downlink configuration is not only a subset of a set of uplink subframes under the uplink-downlink configuration of the primary serving cell, but also a subset of a set of uplink subframes under the uplink-downlink configuration of the secondary serving cell.

11. The apparatus according to claim 10, wherein, the transmission mode and resource determination module is configured to determine, according to the timing relationship between the PDSCH and the HARQ-ACK information of the secondary serving cell determined by the timing relationship determination module, the sets of downlink subframes of the aggregated serving cells in the feedback window corresponding to the uplink subframe.

12. The apparatus according to claim 10, wherein, the transmission mode and resource determination module is configured to: when the set of downlink subframes of the secondary serving cell corresponding to the uplink subframe is not a null set and the set of downlink subframes of the primary serving cell corresponding to the uplink subframe is a null set,
transmit the HARQ-ACK information corresponding to the PDSCH of the secondary serving cell by using a mode of PUCCH format 1a or PUCCH format 1b, wherein PUCCH resources needed to transmit the HARQ-ACK information are determined by using a mode of higher layer configuration with dynamic indication signaling, or the PUCCH resources needed to transmit the HARQ-ACK information are determined only by using a mode of higher layer configuration; or
transmit HARQ-ACK information corresponding to PDSCH of serving cells by using a mode of PUCCH format 1b with channel selection when a Time Division Duplex (TDD) system configures multiple serving cells, wherein a mapping table used during the PUCCH format 1b with channel selection is determined according to a size of a set of downlink subframes ($K_s$) of the secondary serving cell corresponding to the uplink subframe, the HARQ-ACK information of the primary serving cell in the mapping table is set as a Discontinuous Transmission (DTX) state, and the PUCCH resources corresponding to the secondary serving cell are determined by using a mode of higher layer configuration with dynamic indication signaling; or
transmit the HARQ-ACK information corresponding to the PDSCH of the secondary serving cell by using a mode of PUCCH format 1b with channel selection when a TDD system configures a single serving cell, wherein a mapping table used during the PUCCH format 1b with channel selection is determined according to a size of the set of downlink subframes ($K_s$) of the secondary serving cell corresponding to the uplink subframe, and the PUCCH resources corresponding to the downlink subframes corresponding to uplink subframe of the secondary serving cell are determined by using a mode of higher layer configuration with dynamic indication signaling.

13. The apparatus according to claim 12, wherein, the transmission mode and resource determination module is configured to: if determining that the HARQ-ACK information corresponding to the PDSCH of the secondary serving cell is transmitted by using a mode of PUCCH format 1a or PUCCH format 1b,
when $K_s$ only comprises one element, i.e., the uplink subframes need to feed back HARQ-ACK information corresponding to PDSCH of one downlink subframe of the secondary serving cell, if the secondary serving cell is configured to only comprise a transmission mode of one transport block, transmit the HARQ-ACK information corresponding to the PDSCH of the secondary serving cell by using a mode of PUCCH format 1a, and if the secondary serving cell is configured to at most support a transmission mode of two transport blocks, transmit the HARQ-ACK information corresponding to the PDSCH of the secondary serving cell by using a mode of PUCCH format 1b;
when $K_s$ comprises two elements, i.e., the uplink subframes need to feed back HARQ-ACK information of two downlink subframes of the secondary serving cell, obtain 2-bit HARQ-ACK information corresponding to the two downlink subframes after performing spatial bundling on the HARQ-ACK information of the two downlink subframes, and transmit the 2-bit HARQ-ACK information by using a mode of PUCCH format 1b; and
when $K_s$ comprises more than two elements, i.e., the uplink subframes need to feed back HARQ-ACK information of more than two downlink subframes of the secondary serving cell, obtain 2-bit HARQ-ACK information after performing spatial bundling and then time-domain bundling operation on the HARQ-ACK information of the multiple downlink subframes, and then transmit the 2-bit HARQ-ACK information by using a mode of PUCCH format 1b.

14. The apparatus according to claim 12, wherein, the transmission mode and resource determination module is configured to: if determining that the HARQ-ACK information corresponding to the PDSCH of the serving cell is transmitted by using a mode of PUCCH format 1b with channel selection when the TDD system configures multiple serving cells,
when $K_s$ only comprises one element, i.e., the uplink subframes need to feed back HARQ-ACK information of one downlink subframe of the secondary serving cell, if the secondary serving cell is configured to only comprise a transmission mode of one transport block, use a channel selection mapping table of A=2 during carrier aggregation of the TDD system, set the HARQ-ACK information corresponding to the primary serving cell as DTX, and obtain one PUCCH resource corresponding to the second serving cell by using a mode of higher layer configuration with dynamic indication signaling; and if the secondary serving cell is configured to support a transmission mode of two transport blocks, use a channel selection mapping table of A=3 during the carrier aggregation of the TDD system, set the HARQ-ACK information corresponding to the primary serving cell as DTX, and determine two PUCCH resources corresponding to the second serving cell by using a mode of higher layer configuration with dynamic indication signaling;

when $K_s$ comprises two elements, i.e., the uplink subframes need to feed back HARQ-ACK information of two downlink subframes of the secondary serving cell, obtain 2-bit HARQ-ACK information corresponding to the two downlink subframes after performing spatial bundling on the HARQ-ACK information of the two downlink subframes, use a channel selection mapping table of A=4 during the carrier aggregation of the TDD system, set the HARQ-ACK information corresponding to the primary serving cell as DTX, and determine two PUCCH resources corresponding to the second serving cell by using a mode of higher layer configuration with dynamic indication signaling;

when $K_s$ comprises more than two elements, i.e., the uplink subframes need to feed back HARQ-ACK information of more than two downlink subframes of the secondary serving cell, obtain 2-bit HARQ-ACK information after performing spatial bundling and then time-domain bundling operation on the HARQ-ACK information of the multiple downlink subframes, and then transmit the 2-bit HARQ-ACK information by using the PUCCH format 1b, use a channel selection mapping table of M=3 or M=4 (M is a size of $K_s$) during the carrier aggregation of the TDD system, set the HARQ-ACK information corresponding to the primary serving cell as DTX, and determine two PUCCH resources corresponding to the second serving cell by using a mode of higher layer configuration with dynamic indication signaling.

15. The apparatus according to claim 12, wherein,
the transmission mode and resource determination module is configured to: if determining that the HARQ-ACK information corresponding to the PDSCH of the secondary serving cell is transmitted by using a mode of PUCCH format 1b with channel selection when the TDD system configures a single serving cell,
when $K_s$ only comprises one element, i.e., the uplink subframes need to feed back HARQ-ACK information of one downlink subframe of the secondary serving cell, if the secondary serving cell is configured to only comprise a transmission mode of one transport block, transmit the HARQ-ACK information corresponding to the PDSCH of the secondary serving cell by using a mode of PUCCH format 1a, and if the secondary serving cell is configured to at most support a transmission mode of two transport blocks, transmit the HARQ-ACK information corresponding to the PDSCH of the secondary serving cell by using a mode of PUCCH format 1b; and determine corresponding PUCCH resources by using a mode of higher layer configuration with dynamic indication signaling when transmitting the HARQ-ACK information; and
when $K_s$ comprises more than one element, i.e., the uplink subframes need to feed back HARQ-ACK information of more than one downlink subframe of the secondary serving cell, obtain M-bit (M is a size of $K_s$) HARQ-ACK information corresponding to the downlink subframes after performing spatial bundling on the HARQ-ACK information of the downlink subframes, use a channel selection mapping table of M=2 or M=3 or M=4 during a single service of the TDD system, and determine PUCCH resources corresponding to the downlink subframes corresponding to the uplink subframe of the second serving cell by using a mode of higher layer configuration with dynamic indication signaling.

16. The apparatus according to claim 10, wherein,
the transmission mode and resource determination module is configured to determine the transmission mode of the HARQ-ACK information according to a size of a set of downlink subframes ($K_s$) of the secondary serving cell corresponding to the uplink subframe by the following mode:
when the number of elements comprised in $K_s$ is 1 or 2, transmitting the HARQ-ACK information corresponding to the PDSCH of the secondary serving cell by using a mode of PUCCH format 1a or PUCCH format 1b; and when the number of elements comprised in $K_s$ is more than 2, transmitting the HARQ-ACK information corresponding to the PDSCH of the serving cell by using a mode of PUCCH format 1b with channel selection when a TDD system configures multiple serving cells or a single serving cell; or
when the number of elements comprised in $K_s$ is 1, transmitting the HARQ-ACK information corresponding to the PDSCH of the secondary serving cell by using a mode of PUCCH format 1 a or PUCCH format 1b; and when the number of elements comprised in $K_s$ is more than 1, transmitting the HARQ-ACK information corresponding to the PDSCH of the serving cell by using a mode of PUCCH format 1b with channel selection when a TDD system configures multiple serving cells or a single serving cell.

17. The apparatus according to claim 10, wherein,
the transmission mode and resource determination module is configured to: when a set of downlink subframes ($K_s$) of the secondary serving cell corresponding to the uplink subframe is not a null set, a set of downlink subframes ($K_p$) of the primary serving cell corresponding to the uplink subframe is also not a null set, and an intersection set between $K_s$ and $K_p$ is a null set,
transmit the HARQ-ACK information by using a mode of PUCCH format 1b with channel selection when a Time Division Duplex (TDD) system configures multiple serving cells, wherein a mapping table used during the PUCCH format 1b with channel selection is determined according to one with a larger size in sets of $K_s$ and $K_p$, HARQ-ACK information without corresponding downlink subframes in the mapping table is set as a Discontinuous Transmission (DTX) state, and the PUCCH resources corresponding to the secondary serving cell are determined by using a mode of higher layer configuration with dynamic indication signaling.

18. The apparatus according to claim 10, wherein,
the transmission mode and resource determination module is configured to: when a set of downlink subframes ($K_s$) of the secondary serving cell corresponding to the uplink subframe is not a null set, a set of downlink subframes ($K_p$) of the primary serving cell corresponding to the uplink subframe is also not a null set, and an intersection set between $K_s$ and $K_p$ is not a null set,
if downlink subframes with downlink Downlink Assignment Indicator (DAI)=1 and DAI=2in the feedback window of the secondary serving cell are not included in downlink subframes corresponding to the intersection set between $K_s$ and $K_p$, transmit the HARQ-ACK information corresponding to the PDSCH of the serving cell by using a mode of PUCCH format 1b with channel selection when a Time Division Duplex (TDD) system configures multiple serving cells, wherein, a mapping table used during PUCCH format 1b with channel selection is determined according to one with a larger size in sets of $K_s$ and $K_p$, HARQ-ACK information without corresponding downlink subframes in the mapping table is set as a DTX state, and two PUCCH resources ($n_{PUCCH,2}^{(1)}, n_{PUCCH,3}^{(1)}$) corresponding to the secondary serving cell are determined by using a mode of higher layer configuration with dynamic indication signaling;

if one downlink subframe with downlink DAI=1 or DAI=2 in the feedback window of the secondary serving cell is included in the downlink subframes corresponding to the intersection set between $K_s$ and $K_p$, transmit the HARQ-ACK information corresponding to the PDSCH of the serving cell by using a mode of PUCCH format 1b with channel selection when the TDD system configures multiple serving cells, wherein, the mapping table used during PUCCH format 1b with channel selection is determined according to one with a larger size in the sets of $K_s$ and $K_p$, the HARQ-ACK information without corresponding downlink subframes in the mapping table is set as the DTX state, and when the secondary serving cell uses cross-carrier scheduling, one PUCCH resource $n_{PUCCH,2}^{(1)}, n_{PUCCH,3}^{(1)}$ corresponding to the secondary serving cell is determined according to an implicit mapping relationship with a Control Channel Element (CCE) of the Physical Downlink Control Channel (PDCCH) with DAI=1 or DAI=2, and the other PUCCH resource $n_{PUCCH,3}^{(1)}$ or $n_{PUCCH,2}^{(1)}$ is determined by using a mode of higher layer configuration with PDCCH dynamic indication; when the secondary serving cell does not use the cross-carrier scheduling, two PUCCH resources ($n_{PUCCH,2}^{(1)}, n_{PUCCH,3}^{(1)}$) corresponding to the secondary serving cell are determined by using a mode of higher layer configuration with PDCCH dynamic indication; or no matter whether the secondary serving cell uses the cross-carrier scheduling, both two PUCCH resources ($n_{PUCCH,2}^{(1)}, n_{PUCCH,3}^{(1)}$) corresponding to the secondary serving cell are determined by using a mode of higher layer configuration with dynamic indication signaling; and if downlink subframes with downlink DAI=1 and DAI=2 in the feedback window of the secondary serving cell are included in the downlink subframes corresponding to the intersection set between $K_s$ and $K_p$, transmit the HARQ-ACK information corresponding to the PDSCH of the serving cell by using a mode of PUCCH format 1b with channel selection when the TDD system configures multiple serving cells, wherein, the mapping table used during PUCCH format 1b with channel selection is determined according to one with a larger size in the sets of $K_s$ and $K_p$, the HARQ-ACK information without corresponding downlink subframes in the mapping table is set as the DTX state, and when the secondary serving cell uses cross-carrier scheduling, two PUCCH resources ($n_{PUCCH,2}^{(1)}, n_{PUCCH,3}^{(1)}$) corresponding to the secondary serving cell are determined according to an implicit mapping relationship with indexes of Control Channel Elements (CCEs) of PDCCH with DAI=1 and DAI=2 respectively; and when the secondary serving cell does not use the cross-carrier scheduling, two PUCCH resources ($n_{PUCCH,2}^{(1)}, n_{PUCCH,3}^{(1)}$) corresponding to the secondary serving cell are determined by using a mode of higher layer configuration with PDCCH dynamic indication; or no matter whether the secondary serving cell uses the cross-carrier scheduling, both two PUCCH resources ($n_{PUCCH,2}^{(1)}, n_{PUCCH,3}^{(1)}$) corresponding to the secondary serving cell are determined by using a mode of higher layer configuration with dynamic indication signaling; or the transmission mode and resource determination module is configured to: when a set of downlink subframes ($K_s$) of the secondary serving cell corresponding to the uplink subframe is one subset of a set of downlink subframes ($K_p$) of the primary serving cell corresponding to the uplink subframe, or $K_s$ is equal to $K_p$, when the secondary serving cell uses cross-carrier scheduling, determine the PUCCH resources corresponding to the secondary serving cell according to an implicit mapping relationship between PUCCH resources and indexes of CCEs of PDCCH; and when the secondary serving cell does not use the cross-carrier scheduling, determine the PUCCH resources corresponding to the secondary serving cell by using a mode of higher layer configuration with dynamic indication signaling;

or no matter whether the secondary serving cell uses the cross-carrier scheduling, determine the PUCCH resources corresponding to the secondary serving cell by using a mode of higher layer configuration with dynamic indication signaling.

* * * * *